United States Patent
Hirasawa et al.

(10) Patent No.: US 10,769,951 B2
(45) Date of Patent: Sep. 8, 2020

(54) IMAGE PROCESSING APPARATUS, IMAGE PROCESSING METHOD, AND VEHICLE CONTROL SYSTEM TO DETERMINE THE PRESENCE OF AN OBJECT FROM AN IMAGE OF A PERIPHERAL AREA OF A MOVING BODY

(71) Applicant: Sony Corporation, Tokyo (JP)

(72) Inventors: Yasutaka Hirasawa, Tokyo (JP); Hideki Oyaizu, Tokyo (JP); Yuhi Kondo, Tokyo (JP); Suguru Aoki, Tokyo (JP); Taketo Akama, Tokyo (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 15/761,878

(22) PCT Filed: Aug. 30, 2016

(86) PCT No.: PCT/JP2016/075295
§ 371 (c)(1),
(2) Date: Mar. 21, 2018

(87) PCT Pub. No.: WO2017/056822
PCT Pub. Date: Apr. 6, 2017

(65) Prior Publication Data
US 2018/0301032 A1 Oct. 18, 2018

(30) Foreign Application Priority Data
Sep. 30, 2015 (JP) .................................. 2015-193300

(51) Int. Cl.
*G08G 1/16* (2006.01)
*H04N 7/18* (2006.01)
(Continued)

(52) U.S. Cl.
CPC ............ *G08G 1/16* (2013.01); *G06K 9/00798* (2013.01); *G06K 9/209* (2013.01); *G06K 9/2036* (2013.01);
(Continued)

(58) Field of Classification Search
CPC .............. G08G 1/16; G06T 7/11; G06T 7/174
See application file for complete search history.

(56) References Cited

U.S. PATENT DOCUMENTS

| | | | |
|---|---|---|---|
| 5,475,494 A | 12/1995 | Nishida et al. | |
| 7,979,172 B2 * | 7/2011 | Breed | G08G 1/161 701/117 |

(Continued)

FOREIGN PATENT DOCUMENTS

| | | |
|---|---|---|
| JP | 06-293236 A | 10/1994 |
| JP | 2000-353231 A | 12/2000 |

(Continued)

OTHER PUBLICATIONS

Written Opinion and English translation thereof dated Nov. 29, 2016 in connection with International Application No. PCT/JP2016/075295.

(Continued)

*Primary Examiner* — Ramsey Refai
(74) *Attorney, Agent, or Firm* — Wolf, Greenfield & Sacks, P.C.

(57) ABSTRACT

An image acquisition unit 341-1 acquires a polarization image and a non-polarization image indicating a peripheral area of a moving body, such as the peripheral area of a vehicle. A discrimination information generation unit 342-1 uses the polarization image acquired by the image acquisition unit 341-1 and generates analysis object discrimination information indicating a road surface or the like. An image analysis unit 344-1 uses an image of an image analysis area (Continued)

set on the basis of the analysis object discrimination information generated by the discrimination information generation unit 342-1 with respect to the non-polarization image acquired by the image acquisition unit 341-1, and performs a discrimination of an object, such as an obstacle on the road surface. It is possible to efficiently perform a determination of the presence of the object from the non-polarization image of the peripheral area of the moving body.

13 Claims, 25 Drawing Sheets

(51) Int. Cl.
| | |
|---|---|
| *G06K 9/20* | (2006.01) |
| *G06K 9/00* | (2006.01) |
| *G06T 7/11* | (2017.01) |
| *G06T 7/174* | (2017.01) |
| *G06K 9/32* | (2006.01) |

(52) U.S. Cl.
CPC .............. *G06K 9/3241* (2013.01); *G06T 7/11* (2017.01); *G06T 7/174* (2017.01); *G08G 1/166* (2013.01); *H04N 7/18* (2013.01); *H04N 7/181* (2013.01); *G06K 9/00201* (2013.01); *G06T 2207/30252* (2013.01)

(56) References Cited

U.S. PATENT DOCUMENTS

| | | | | |
|---|---|---|---|---|
| 9,025,027 | B2* | 5/2015 | Xue | ..................... G01J 3/0229 |
| | | | | 348/148 |
| 9,944,293 | B2* | 4/2018 | Kasahara | .............. B60S 1/0844 |
| 9,990,556 | B2* | 6/2018 | Okada | ........................ G06T 7/20 |
| 10,049,460 | B2* | 8/2018 | Romano | .................. G06F 3/011 |
| 2015/0178582 | A1* | 6/2015 | Okada | ........................ G06T 7/20 |
| | | | | 382/104 |

FOREIGN PATENT DOCUMENTS

| | | |
|---|---|---|
| JP | 2008-015573 A | 1/2008 |
| JP | 2012-142903 A | 7/2012 |
| JP | 2015-133078 A | 7/2015 |
| WO | WO 2015/045501 A1 | 4/2015 |

OTHER PUBLICATIONS

International Preliminary Report on Patentability and English translation thereof dated Apr. 12, 2018 in connection with International Application No. PCT/JP2016/075295.

International Search Report and English translation thereof dated Nov. 29, 2016 in connection with International Application No. PCT/JP2016/075295.

\* cited by examiner

IMAGE PROCESSING APPARATUS, IMAGE PROCESSING METHOD, AND VEHICLE CONTROL SYSTEM TO DETERMINE THE PRESENCE OF AN OBJECT FROM AN IMAGE OF A PERIPHERAL AREA OF A MOVING BODY

CROSS-REFERENCE TO RELATED APPLICATIONS

This application claims the benefit under 35 U.S.C. § 371 as a U.S. National Stage Entry of International Application No. PCT/JP2016/075295, filed in the Japanese Patent Office as a Receiving Office on Aug. 30, 2016, which claims priority to Japanese Patent Application Number JP2015-193300, filed in the Japanese Patent Office on Sep. 30, 2015, each of which is hereby incorporated by reference in its entirety.

TECHNICAL FIELD

The present technology relates to an image processing apparatus, an image processing method, and a vehicle control system, and aims at enabling determination of the presence of an object to be efficiently performed from an image of a peripheral area of a moving body.

BACKGROUND ART

In the past, the determination of the presence of an object in a real space has been performed by using a plurality of images obtained by photographing the real space. In PTL 1, for example, a kinetic area is detected from respective images obtained by photographing the real space by a plurality of cameras and is converted to a plane coordinate system. Also, an overlap of the converted kinetic areas is detected, and on the basis of the detection result, it is determined whether or not the kinetic area exists in a specified plane in the space.

CITATION LIST

Patent Literature

[PTL 1]
JP 2008-015573A

SUMMARY

Technical Problem

Meanwhile, an area in which the object exists may be limited to a particular area in the real space. In such a case, when the presence of the object is discriminated by using the whole image obtained by photographing the real space, the discrimination of the presence of the object is performed also to an unnecessary area and efficient processing cannot be performed.

Thus, it is an object of the present technology to provide an image processing apparatus, an image processing method, and a vehicle control system that enable the determination of the presence of the object to be efficiently performed from images of the peripheral area of the moving body.

Solution to Problem

An image processing apparatus according to a first aspect of the present technology includes
a discrimination information generation unit configured to generate analysis object discrimination information by using a polarization image indicating a peripheral area of a moving body, and
an image analysis unit configured to perform discrimination of an object by using an image of an image analysis area set on the basis of the analysis object discrimination information generated by the discrimination information generation unit to a non-polarization image indicating the peripheral area of the moving body.

In this technology, the discrimination information generation unit generates the analysis object discrimination information by using the polarization image indicating the peripheral area of the moving body. For example, the discrimination information generation unit calculates a normal line on the basis of the polarization image and generates the analysis object discrimination information indicating this road surface using, as an area of the road surface, a continuous image area in which a direction of the normal line is a vertical direction of the moving body. Also, the discrimination information generation unit generates information related to a braking distance of the moving body as the analysis object discrimination information. In the information related to the braking distance of the moving body, the braking distance is calculated from a moving speed of the moving body and, for example, an image generated by a capturing unit capable of distance detection or the polarization image capable of detecting distance information and a roughness of a moving surface, and information indicating an area within the braking distance in the non-polarization image is generated on the basis of the calculated braking distance and a distance on the non-polarization image. The image analysis unit performs discrimination of the object by using an image of the image analysis area set on the basis of the analysis object discrimination information generated by the discrimination information generation unit on the non-polarization image indicating the peripheral area of the moving body. For example, the image analysis unit performs the discrimination of the object by using an area of the road surface or an image within the braking distance on the basis of the analysis object discrimination information.

Further, in a case where the image analysis unit is provided in plurality, the plurality of image analysis units share an area in which the non-polarization image is divided on the basis of the analysis object discrimination information and perform the discrimination of the object. For example, the plurality of image analysis units perform discrimination of the object in an area within the braking distance by using many image analysis units as compared with other image areas.

Further, an image transfer unit that performs a transfer of the non-polarization image acquired by the image acquisition unit is provided, the image analysis unit is connected to the image transfer unit via a communication network, and the image transfer unit performs control of the transfer of the non-polarization image on the basis of the analysis object discrimination information generated by the discrimination information generation unit and, for example, transfers an image of the image analysis area or a combination of an image selected from a plurality of images different in a capturing direction and the analysis object discrimination information to the image analysis unit.

Further, an image analysis control unit and the plurality of image analysis units are provided, and the image analysis control unit generates image analysis control information to control that how discrimination of the object to the non-polarization image transferred to the image analysis unit from the image transfer unit is performed by the plurality of image analysis units on the basis of the analysis object discrimination information generated by the discrimination information generation unit and transmits the image analysis control information to the image analysis unit along with the non-polarization image.

An image processing method according to a second aspect of the present technology includes generating analysis object discrimination information by a discrimination information generation unit by using a polarization image indicating a peripheral area of a moving body, and performing discrimination of an object by an image analysis unit by using an image of an image analysis area set on the basis of the analysis object discrimination information generated by the discrimination information generation unit to a non-polarization image indicating the peripheral area of the moving body.

A vehicle control system according to a third aspect of the present technology includes a discrimination information generation unit configured to generate analysis object discrimination information by using a polarization image indicating a peripheral area of a vehicle, an image analysis unit configured to perform discrimination of an object by using an image of an image analysis area set on the basis of the analysis object discrimination information generated by the discrimination information generation unit to a non-polarization image indicating the peripheral area of a moving body, and a driving system control unit configured to perform a vehicle traveling control unit on the basis of a discrimination result of the object in the image analysis unit.

Advantageous Effect of Invention

According to the present technology, the analysis object discrimination information is generated by the discrimination information generation unit by using the polarization image indicating the peripheral area of the moving body. The image analysis unit performs the discrimination of the object by using the image of the image analysis area set on the basis of the analysis object discrimination information generated by the discrimination information generation unit on the non-polarization image indicating the peripheral area of the moving body. Therefore, the determination of the presence of the object can be efficiently performed from an image of the peripheral area of the moving body. Note that the effect described in the present specification is merely illustrative and not limited thereto, and there may be additional effects.

DESCRIPTION OF EMBODIMENTS

Figure 1:
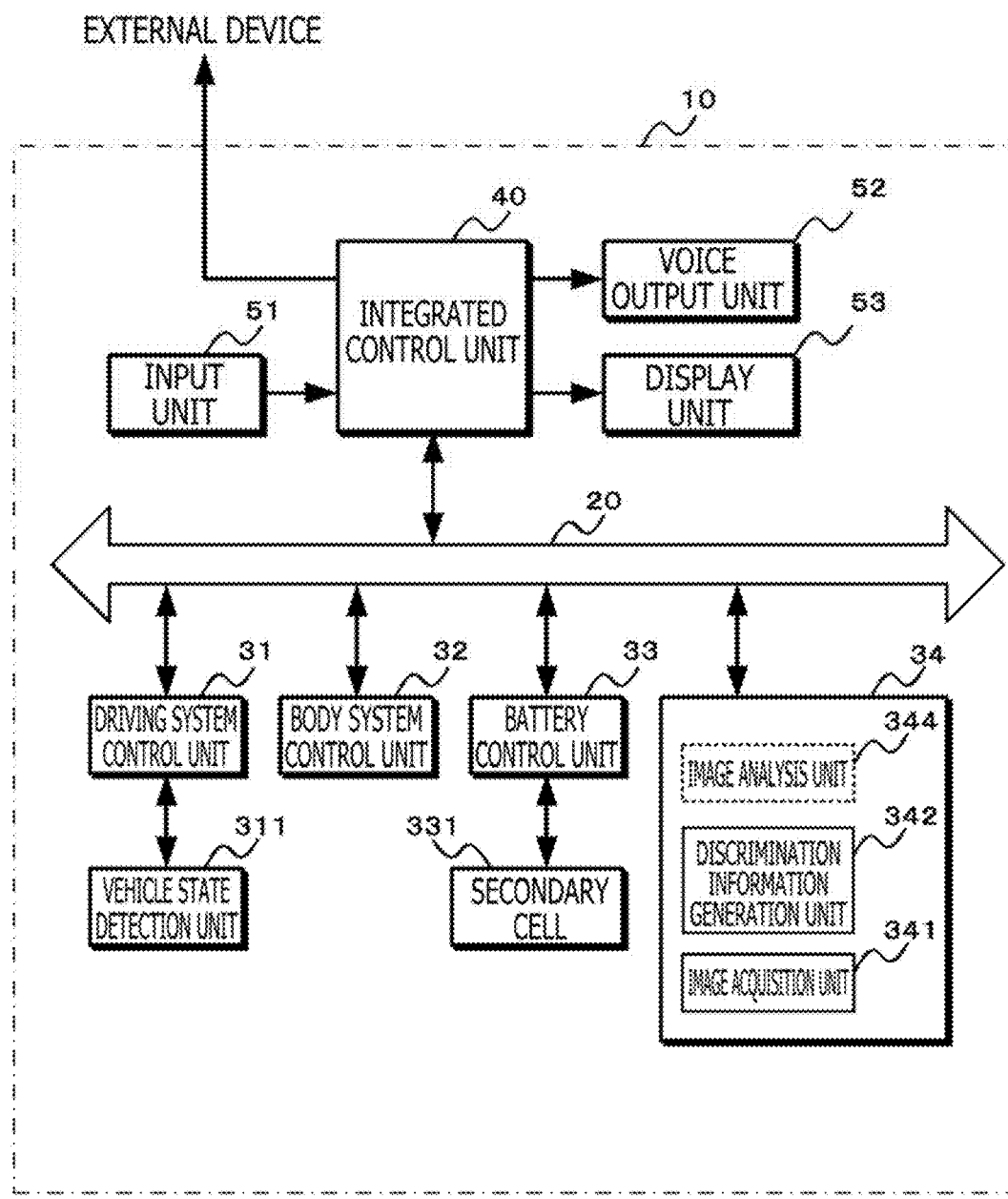
FIG. 1 is a block diagram exemplifying an outline configuration of a vehicle control system.

Hereinafter, embodiments of the present technology will be described. In an image processing apparatus of the present technology, a polarization image and a non-polarization image indicating a peripheral area of a moving body are acquired. Also, analysis object discrimination information is generated by using the acquired polarization image. Further, discrimination of an object is performed by using an image of an image analysis area set on the basic of the analysis object discrimination information to the non-polarization image. Next, a case in which the moving body is, for example, a vehicle will be described. Note that the description will be made in the following order.
1. Vehicle Control System
2. Image Processing Apparatus
3. First Embodiment
4. Second Embodiment
5. Third Embodiment
6. Fourth Embodiment
7 Fifth Embodiment
8. Sixth Embodiment
9. Seventh Embodiment
10. Another Embodiment 1. Vehicle Control System FIG. 1 is a block diagram exemplifying an outline configuration of a vehicle control system. A vehicle control system 10 includes a plurality of control units and a detection unit connected to each other via a communication network 20. In an example illustrated in FIG. 1, the vehicle control system 10 includes a driving system control unit 31, a body system control unit 32, a battery control unit 33, an outer-vehicle information detection unit 34, and an integrated control unit 40. The communication network 20 may be an on-vehicle communication network conforming to an arbitrary standard such as a CAN (Controller Area Network), a LIN (Local Interconnect Network), a LAN (Local Area Network), or a FlexRay (registered trademark), for example. Also, an input unit 51, a voice output unit 52, and a display unit 53 are connected to the integrated control unit 40.

Each control unit includes a microcomputer that performs arithmetic processing in accordance with various programs, a storage unit that stores programs executed by the microcomputer, parameters used for various operations, or the like, and a driving circuit that drives various devices to be controlled.

The driving system control unit 31 controls an operation of devices related to a driving system of vehicles in accordance with various programs. For example, the driving system control unit 31 functions as a driving force generation device for generating a driving force of vehicles of an internal-combustion engine, a motor for driving, or the like, a driving force transmission mechanism for transmitting a driving force to wheels, and a steering mechanism for adjusting a rudder angle of vehicles. Also, the driving system control unit 31 may have functions as a control device such as a damping device etc. that generate a damping force of vehicles, and as a control device such as an ABS (Antilock Brake System) or an ESC (Electronic Stability Control)

A vehicle state detection unit 311 is connected to the driving system control unit 31. In the vehicle state detection unit 311, for example, at least one of a gyro sensor that detects an angular velocity of an axial rotational motion of vehicles, an acceleration sensor that detects an acceleration of vehicles, and a sensor for detecting an operation amount of an accelerator pedal, an operation amount of a brake pedal, a steering angle of a steering wheel, the number of an engine rotational speed, a traveling speed, and the like is included. The driving system control unit 31 performs arithmetic processing by using signals input from the vehicle state detection unit 311 and controls an internal-combustion engine, a motor for driving, an electric power steering device, a brake device, or the like.

The body system control unit 32 controls operations of various devices provided on a vehicle body in accordance with various programs. For example, the body system control unit 32 functions as a control device of a keyless entry system, a smart key system, a power window device, or various lamps such as a head lamp, a back lamp, a brake lamp, a turn signal, or a fog lamp. In this case, in the body system control unit 32, radio waves transmitted from a mobile device that is substituted for a key or signals of various switches can be input. The body system control unit 32 receives these inputs of radio waves or signals and controls a door lock device, a power window device, lamps, and the like of vehicles.

The battery control unit 33 controls a secondary cell 331 that is a power supply source of the motor for driving in accordance with various programs. In the battery control unit 33, for example, information related to a battery temperature, a battery output voltage, a residual capacity of the battery, or the like is input from a battery device provided with the secondary cell 331. The battery control unit 33 performs arithmetic processing by using these signals, and performs temperature regulation control of the secondary cell 331 or control of a cooling device etc. provided in the battery device.

The outer-vehicle information detection unit 34 detects external information of the vehicle on which the vehicle control system 10 is mounted. The outer-vehicle information detection unit 34 includes an image acquisition unit 341, a discrimination information generation unit 342, and an image analysis unit 344. The image acquisition unit 341 has a camera that acquires a polarization image, a TOF (Time Of Flight) camera capable of measurement, a stereo camera, or the like.

Figure 2:
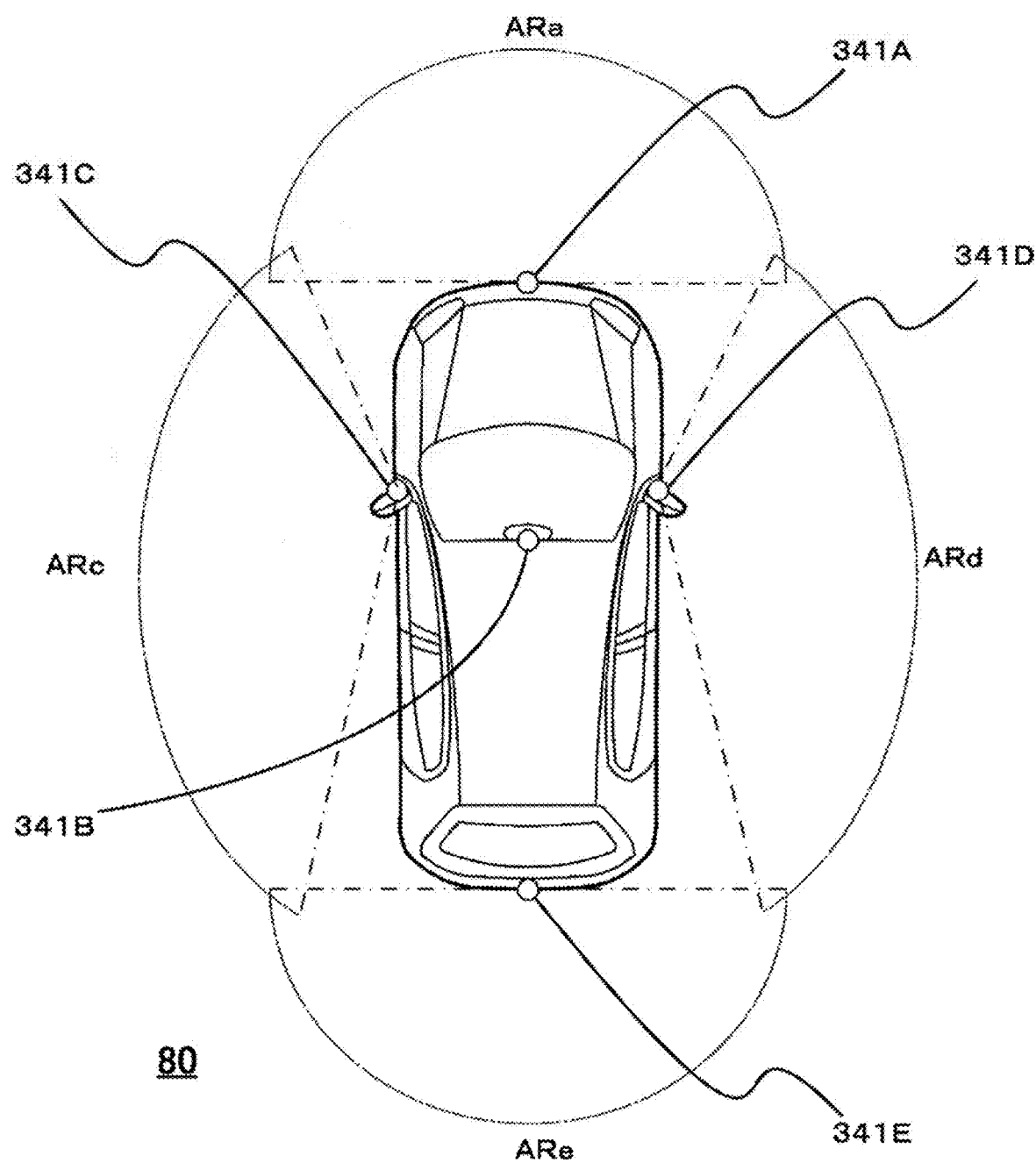
FIG. 2 is a diagram illustrating an installation example of an image acquisition unit.

FIG. 2 is a diagram illustrating an installation example of the image acquisition unit. For example, the image acquisition unit 341 is installed in at least one position of a front nose, side mirrors, a rear bumper, a back door, and an upper portion of a windshield in the vehicle interior of a vehicle 80. An image acquisition unit 341A installed in the front nose and an image acquisition unit 341B installed in the upper portion of the windshield in the vehicle interior mainly acquire images before the vehicle 80. Image acquisition units 341C and 341D installed in the side mirrors mainly acquire images on the sides of the vehicle 80. An image acquisition unit 341E installed in the rear bumper or back door mainly acquires images after the vehicle 80. In addition, in FIG. 2, an example of photographing ranges of respective image acquisition units 341A to 341E is illustrated. A capturing range ARa indicates a capturing range of the image acquisition unit 341A installed in the front nose and a capturing range ARb indicates a capturing range of the image acquisition unit 341B installed in the upper portion of the windshield in the vehicle interior. Capturing ranges ARc and ARd indicate capturing ranges of the image acquisition units 341C and 341D installed in the side mirrors individually, and a capturing range ARe indicates a capturing range of the image acquisition unit 341E installed in the rear bumper or back door.

Returning to FIG. 1, the outer-vehicle information detection unit 34 outputs an image obtained by capturing a peripheral area of the vehicle by the image acquisition unit 341 to the discrimination information generation unit 342 and the image analysis unit 344. The discrimination information generation unit 342 performs a detection of a road surface, calculation of a braking distance, or the like on the basis of the image obtained by the image acquisition unit 341 and generates the analysis object discrimination information indicating a detection result of the road surface, a calculation result of the braking distance, or the like to output the analysis object discrimination information to the image analysis unit 344.

The image analysis unit 344 performs an image analysis by using an image of the image analysis area set on the basis of the analysis object discrimination information generated by the discrimination information generation unit 342 on the non-polarization image obtained by the image acquisition unit 341 and performs determination of an object such as an obstacle. A determination result of the object is information usable for traveling of vehicles and the image analysis unit 344 outputs the determination result of the object to the integrated control unit 40. In addition, the image analysis unit 344 may be installed in the integrated control unit 40 and in the outer-vehicle information detection unit 34, the image or a combination of the image and the analysis object discrimination information may be output to the integrated control unit 40 via the communication network 20.

The input unit 51, the voice output unit 52, and the display unit 53 are connected to the integrated control unit 40. The input unit 51 is implemented by a device capable of an input operation by a passenger, for example, a touch panel, a button, a microphone, a switch, a lever, or the like. The input unit 51 generates an input signal on the basis of the information input by the passenger etc. and outputs the input signal to the integrated control unit 40.

The voice output unit 52 outputs voices based on voice signals from the integrated control unit 40 and thereby auditorily notifies the passenger of the vehicle of the information. The display unit 53 performs an image display on the basis of image signals from the integrated control unit 40 and visually notifies the passenger of the vehicle of the information.

The integrated control unit 40 has a CPU (Central Processing Unit), a ROM (Read Only Memory), a RAM (Random Access Memory), and the like. The ROM (Read Only Memory) stores various programs executed by the CPU (Central Processing Unit). The RAM (Random Access Memory) stores information related to various parameters, operation results, sensor values, or the like. The CPU executes various programs stored in the ROM and controls the entire operations in the vehicle control system 10 in accordance with input signals from the input unit 51, information acquired by communication with each of the control units and the detection unit via the communication network 20, the information stored in the RAM, and the like. Also, the integrated control unit 40 generates a voice signal indicating information of which the passenger of the vehicle is auditorily notified to output the voice signal to the voice output unit 52 and generates an image signal indicating information of which the passenger of the vehicle is visually notified to output the image signal to the display unit 53. Also, the integrated control unit 40 may have a communication interface that performs communication with various devices present in an external environment or other vehicles, etc., a measuring unit that generates positional information including a latitude, a longitude, and an altitude of the vehicle, or the like.

In addition, in the example illustrated in FIG. 1, at least two control units connected via the communication network 20 may be integrated into a single control unit. Alternatively, each individual control unit may be configured by a plurality of control units. Further, the vehicle control system 10 may include other control units not illustrated. Also, in the foregoing descriptions, a part or all of functions born by any control units may be given to the other control units. That is, when information is transmitted and received via the communication network 20, predetermined arithmetic processing may be performed by any control unit.

2. Image Processing Apparatus

Next, an embodiment in a case in which the image processing apparatus of the present technology is applied to the outer-vehicle information detection unit of the vehicle control system illustrated in FIG. 1 as described above will be described.

3. First Embodiment

Figure 3:
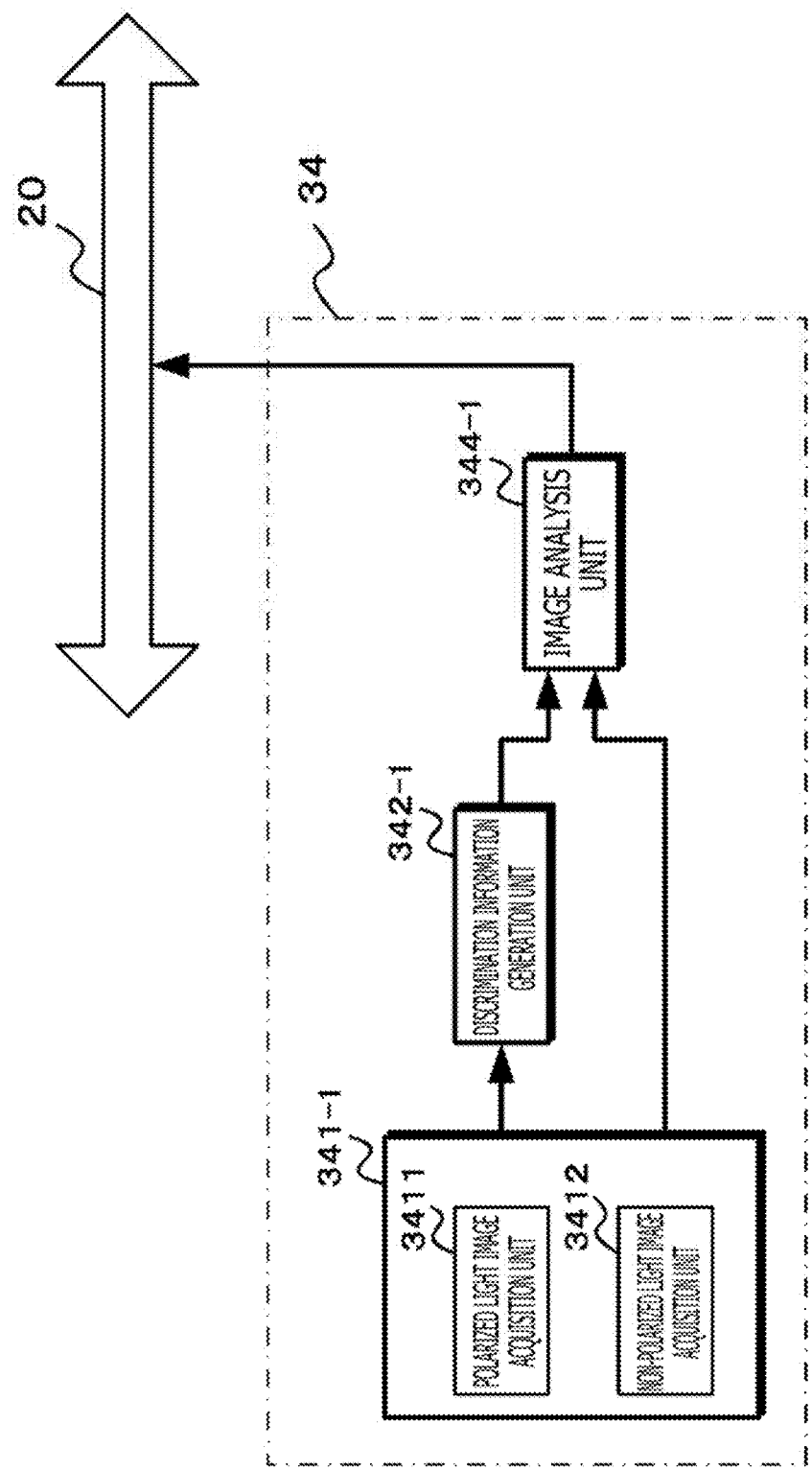
FIG. 3 is a diagram illustrating a configuration of a first embodiment.

FIG. 3 illustrates a configuration of a first embodiment. The outer-vehicle information detection unit 34 includes an image acquisition unit 341-1, a discrimination information generation unit 342-1, and an image analysis unit 344-1. Also, the image acquisition unit 341-1 includes a polarization image acquisition unit 3411 that acquires the polarization image and a non-polarization image acquisition unit 3412 that acquires the non-polarization image.

Figure 4:
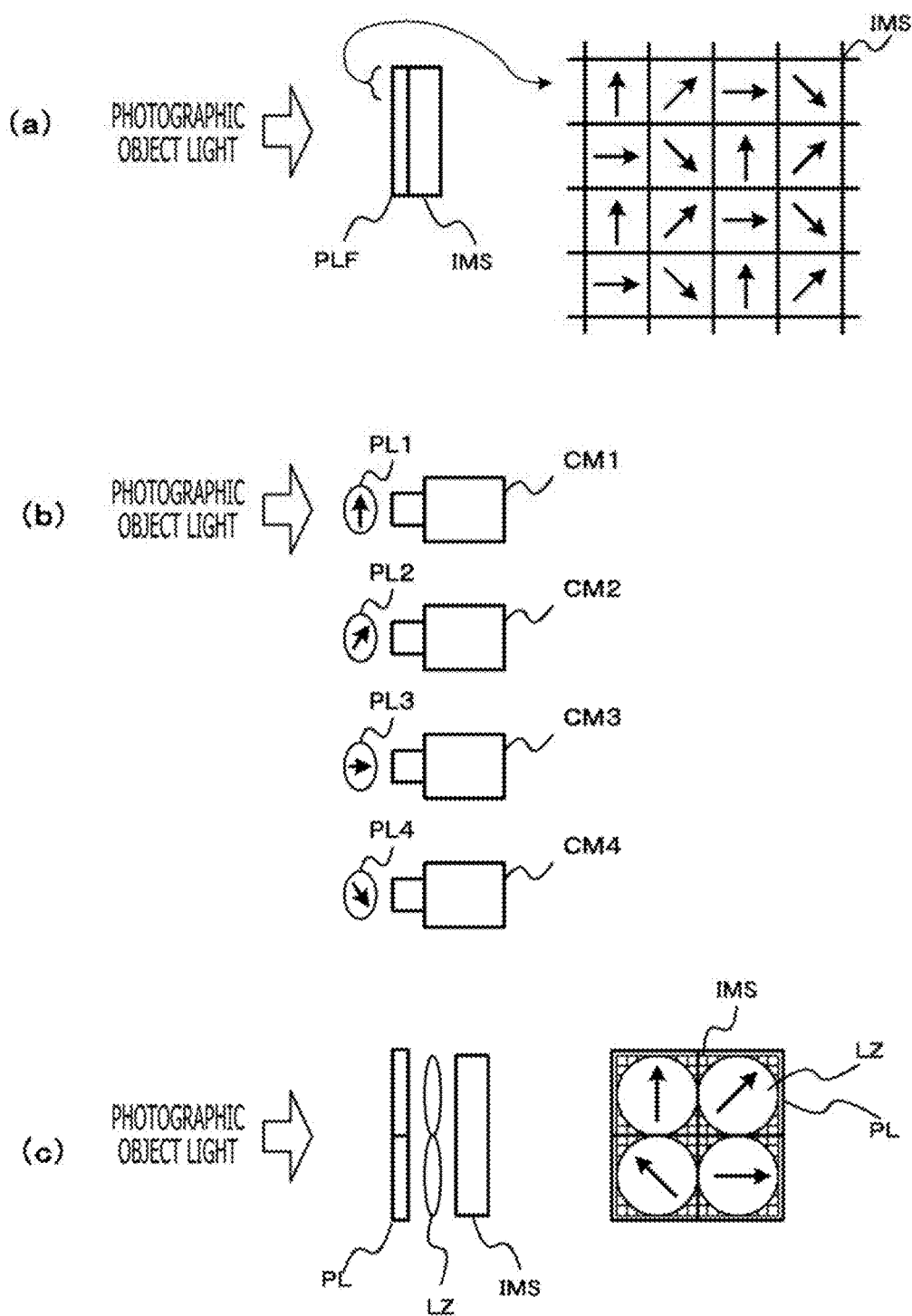
FIG. 4 is a diagram illustrating a polarization image acquired by a polarization image acquisition unit.

The polarization image acquisition unit 3411 acquires a plurality of polarization images different in the polarization direction, for example, the polarization image in which the polarization direction is three or more directions. FIG. 4 is a diagram illustrating the polarization image acquired by the polarization image acquisition unit 3411. As illustrated in (a) of FIG. 4, for example, the polarization image is generated by arranging a polarizing filter PLF in which pixels are configured in an image sensor IMS in the polarization direction of three or more directions and performing capturing. In addition, in (a) of FIG. 4, a case in which the polarizing filter PLF in which each pixel is any pixel in four different types of polarization directions (the polarization direction is indicated by an arrow) is arranged on a plane of incidence of the image sensor IMS is exemplified. Also, as illustrated in (b) of FIG. 4, the polarization image may be generated by installing polarizing plates PL1 to PL4 different in the polarization direction in front of cameras CM1 to CM4 and performing the capturing by the cameras CM1 to CM4. Further, as illustrated in (c) of FIG. 4, the plurality of polarization images different in the polarization direction may be generated by using a configuration of a multi-lens array. For example, a lens LZ is provided in plurality (four pieces in the figure) on a front surface of the image sensor IMS and an optical image of a photographic object is individually formed on a capturing surface of the image sensor IMS by each lens LZ. Also, the polarizing plate PL is provided on the front surface of each lens LZ and the polarization direction of the polarizing plate PL is set to a different direction. Such a configuration permits the polarization image different in the polarization direction to be generated by the image sensor IMS.

The non-polarization image acquisition unit 3412 acquires the non-polarization image. The non-polarization image acquisition unit 3412 performs the capturing without providing the polarizing plate or the polarizing filter on the plane of incidence of the image sensor to thereby generate the non-polarization image. Also, the non-polarization image acquisition unit 3412 may generate the non-polarization image from the polarization image acquired by the polarization image acquisition unit 3411. When a color filter is not used by the polarization image acquisition unit 3411, a luminance polarization image can be acquired. Here, in a case of (a) of FIG. 4, for example, luminance of four pixels adjacent to each other in a direction different in the polarization direction is averaged and thereby an image in the same manner as in a normal luminance image of the non-polarized light can be acquired. Also, in a case of (b) of FIG. 4, luminance of the luminance polarization images different in the polarization direction in each pixel is averaged and thereby an image in the same manner as in the normal luminance image of the non-polarized light can be acquired. Further, in a case of (c) of FIG. 4, when a distance between the lenses LZ is negligible short as compared with a distance up to the photographic object, a parallax is negligible in the plurality of polarization images different in the polarization direction. Therefore, the luminance of the polarization images different in the polarization direction is averaged and thereby an image in the same manner as in the normal luminance image of the non-polarized light can be acquired. Also, in a case where the parallax is not negligible, the polarization images different in the polarization direction are positioned in accordance with a parallax amount and, when the luminance of the polarization images is averaged after the positioning, an image in the same manner as in the normal luminance image of the non-polarized light can be acquired.

Figure 5:
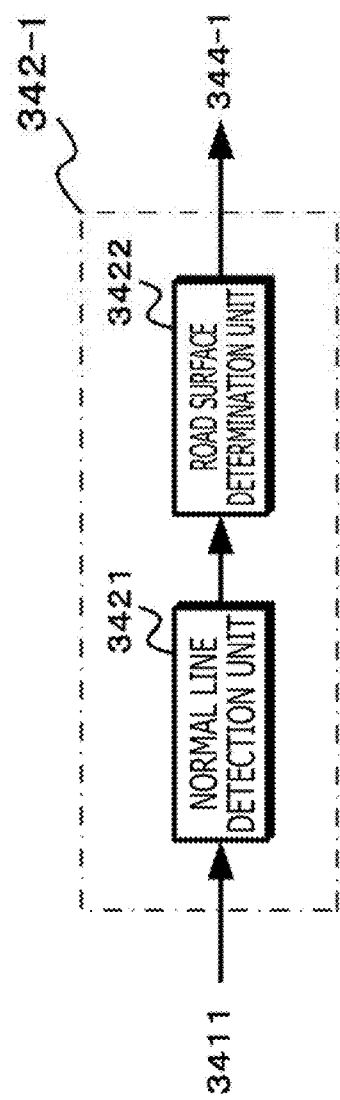
FIG. 5 is a diagram exemplifying a configuration of a discrimination information generation unit.

FIG. 5 exemplifies a configuration of the discrimination information generation unit. The discrimination information generation unit 342-1 includes a normal line detection unit 3421 and a road surface determination unit 3422. The normal line detection unit 3421 detects a normal line from the plurality of polarization images different in the polarization direction acquired by the polarization image acquisition unit 3411.

Figure 6:
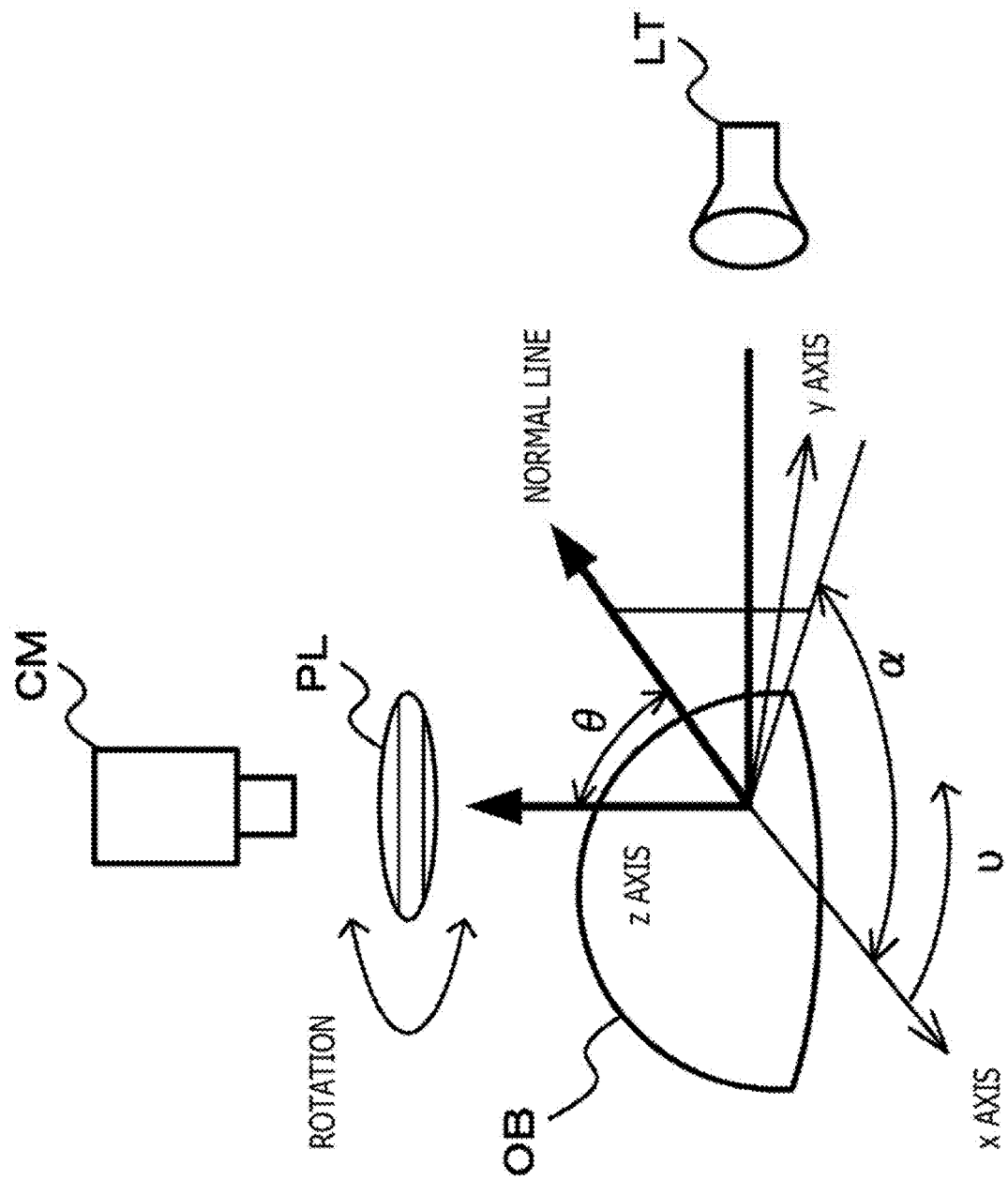
FIG. 6 is a schematic diagram illustrating a shape and a polarization image of a photographic object.

Here, a shape and the polarization image of the photographic object will be described with reference to FIG. 6. As illustrated in FIG. 6, for example, illumination of the photographic object OB is performed by using a light source LT and the camera CM performs the capturing of the photographic object OB via the polarizing plate PL. In this case, in a captured image, the luminance of the photographic object OB is changed in accordance with the polarization direction of the polarizing plate PL. In addition, for ease of description, for example, the capturing is performed while rotating the polarizing plate PL to thereby acquire the plurality of polarization images and a highest luminance is set to $l_{max}$ and a lowest luminance is set to $l_{min}$. Also, when an x axis and a y axis in a two-dimensional coordinate system are present on a plane of the polarizing plate PL, an angle in the y axis direction to the x axis at the time of rotating the polarizing plate PL is set to a polarization angle v.

Figure 7:
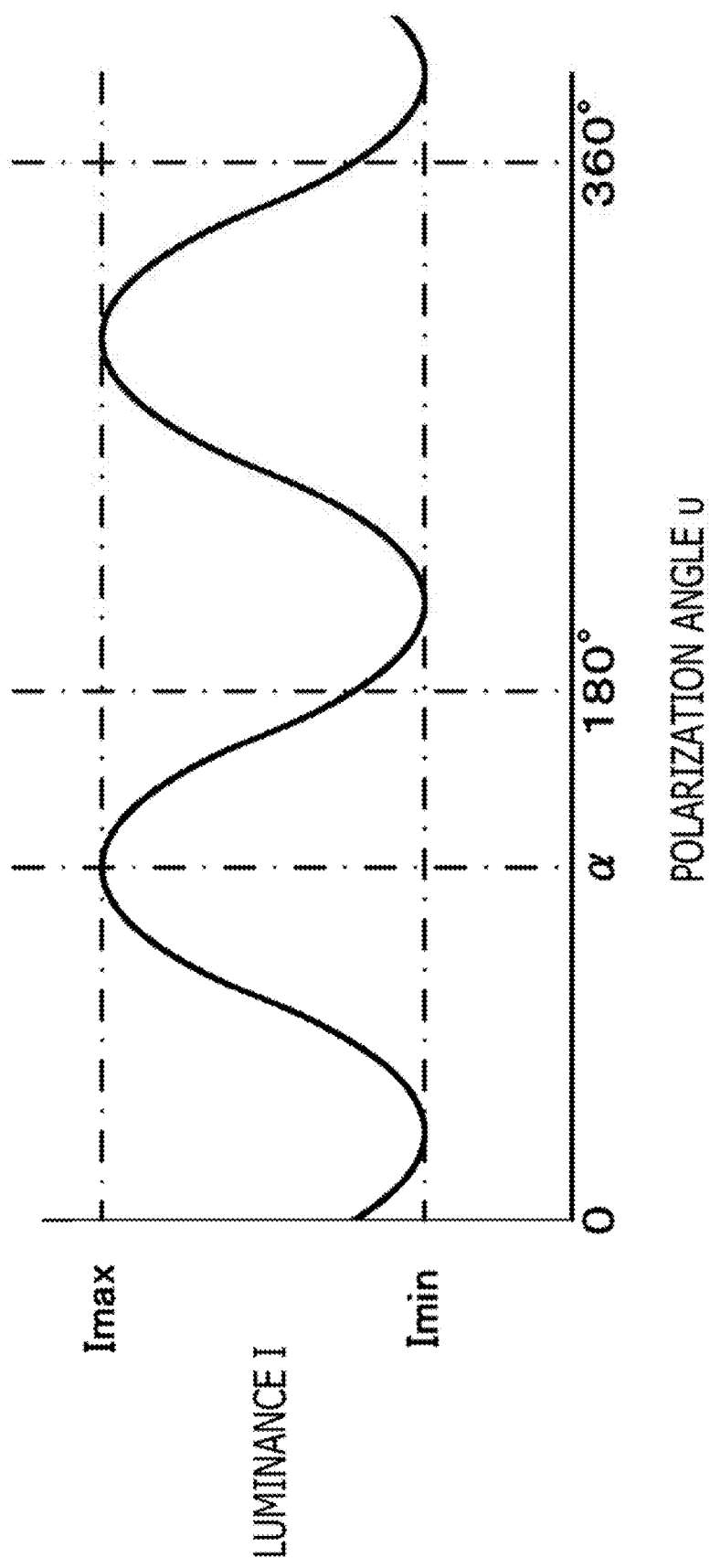
FIG. 7 is a diagram exemplifying a relationship between luminance and a polarization angle.

The polarizing plate PL has a period of 180 degrees in which when rotated by 180 degrees, the polarizing plate PL returns to an original polarization state. Also, the polarization angle v at the time when a maximum luminance $l_{max}$ is observed is set to an azimuth angle α. When such a definition is performed, the luminance l observed at the time of rotating the polarizing plate PL can be represented as in formula (1). In addition, FIG. 7 exemplifies a relationship between the luminance and the polarization angle. Also, this example indicates a model of diffusion reflection and, in the case of mirror reflection, the azimuth angle is deviated by 90 degrees as compared with the polarization angle.

[Math. 1]
$$I = \frac{I_{max} + I_{min}}{2} + \frac{I_{max} - I_{min}}{2}\cos(2v - 2\alpha) \quad (1)$$

In formula (1), the polarization angle v is evident at the time when the polarization image is generated, and the maximum luminance $l_{max}$, a minimum luminance $l_{min}$, and the azimuth angle α are variables. Therefore, by using the luminance of the polarization image in which the polarization direction is three or more directions, fitting to a model formula represented in formula (1) is performed and thereby the azimuth angle α that is the polarization angle as the maximum luminance can be discriminated on the basis of the model formula representing a relationship between the luminance and the polarization angle.

Also, a normal line on an object surface is represented by a polar coordinate system and the normal line is set to the azimuth angle α and a zenithal angle θ. In addition, the zenithal angle θ is set to an angle from a z axis to the normal line and the azimuth angle α is set to an angle in the y axis direction to the x axis as described above. Here, when the minimum luminance $l_{min}$ and the maximum luminance $l_{max}$ are obtained at the time of rotating the polarizing plate PL, a polarization degree ρ can be calculated on the basis of formula (2).

[Math. 2]
$$\rho = \frac{I_{max} - I_{min}}{I_{max} + I_{min}} \quad (2)$$

Figure 8:
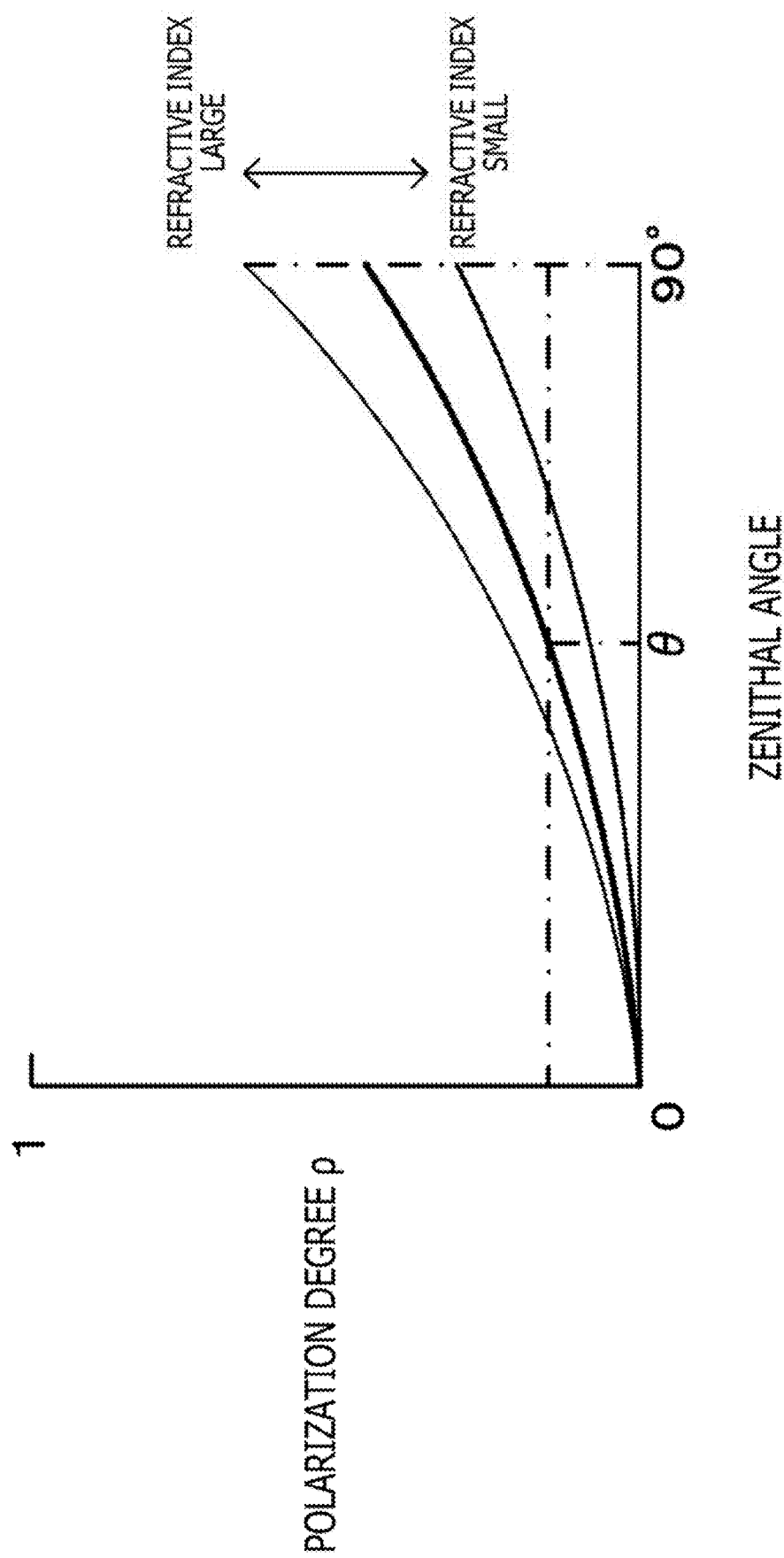
FIG. 8 is a diagram illustrating a relationship between a polarization degree and a zenithal angle.

In the case of the diffusion reflection, a relationship between the polarization degree and the zenithal angle is, for example, known to have characteristics illustrated in FIG. 8 from Fresnel's formula. Therefore, the zenithal angle θ can be discriminated on the basis of the polarization degree ρ from the characteristics illustrated in FIG. 8. In addition, the characteristics illustrated in FIG. 8 are illustrative and the characteristics are changed depending on a refractive index etc. of the photographic object. For example, as the refractive index grows larger, the polarization degree becomes larger.

The normal line detection unit 3421 calculates the azimuth angle α and the zenithal angle θ for each pixel in this way and outputs, as a normal line detection result, a normal line for each pixel indicating the calculated azimuth angle α and zenithal angle θ to the road surface determination unit 3422.

On the basis of the normal line detection result from the normal line detection unit 3421, the road surface determination unit 3422 sets, to the road surface, a continuous area in which the normal direction is present in a predetermined angle range in the horizontal direction on the basis of the vertical direction of the vehicle 80. The discrimination information generation unit 342 outputs the analysis object discrimination information indicating the detection result of the road surface to the image analysis unit 344-1.

The image analysis unit 344-1 performs the image analysis of the image analysis area set on the basis of the analysis object discrimination information generated by the discrimination information generation unit 342-1 on the non-polarization image obtained by the image acquisition unit 341-1. Specifically, the image analysis unit 344-1 performs the image analysis using, as the image analysis area, an area detected as the road surface in the non-polarization image and performs the determination of the obstacle etc. In addition, in order to facilitate detection of the obstacle positioned at the end of the road surface, the image analysis unit 344-1 may set the image analysis area to be widened in the horizontal direction on the basis of the area of the road surface.

Figure 9:
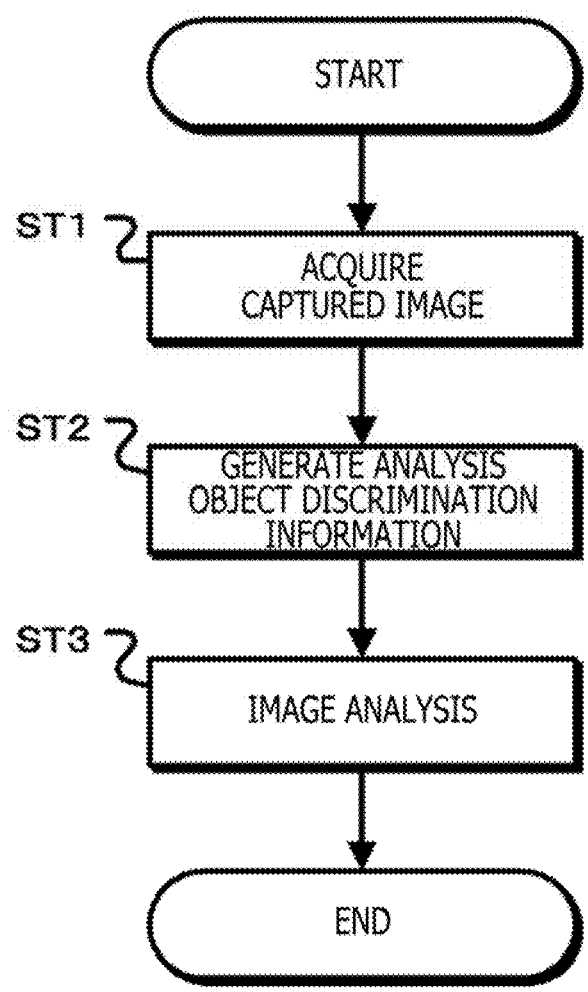
FIG. 9 is a flowchart exemplifying an operation of the first embodiment.

FIG. 9 is a flowchart illustrating an operation of the first embodiment. In step ST1, the outer-vehicle information detection unit 34 acquires the captured image. The image acquisition unit 341-1 of the outer-vehicle information detection unit 34 acquires the polarization image and non-polarization image obtained by capturing the peripheral area of the vehicle 80 and proceeds to step ST2.

In step ST2, the outer-vehicle information detection unit 34 generates the analysis object discrimination information. On the basis of the polarization image acquired in step ST1, for example, the discrimination information generation unit 342-1 of the outer-vehicle information detection unit 34 generates the analysis object discrimination information indicating a road surface detection result and proceeds to step ST3.

In step ST3, the outer-vehicle information detection unit 34 performs the image analysis. The image analysis unit 344-1 of the outer-vehicle information detection unit 34 performs the image analysis of the image analysis area set on the basis of the analysis object discrimination information generated in step ST2 on the non-polarization image acquired in step ST1. That is, the image analysis unit 344-1 performs the image analysis using, as the image analysis area, an area detected as the road surface in the non-polarization image.

Figure 10:
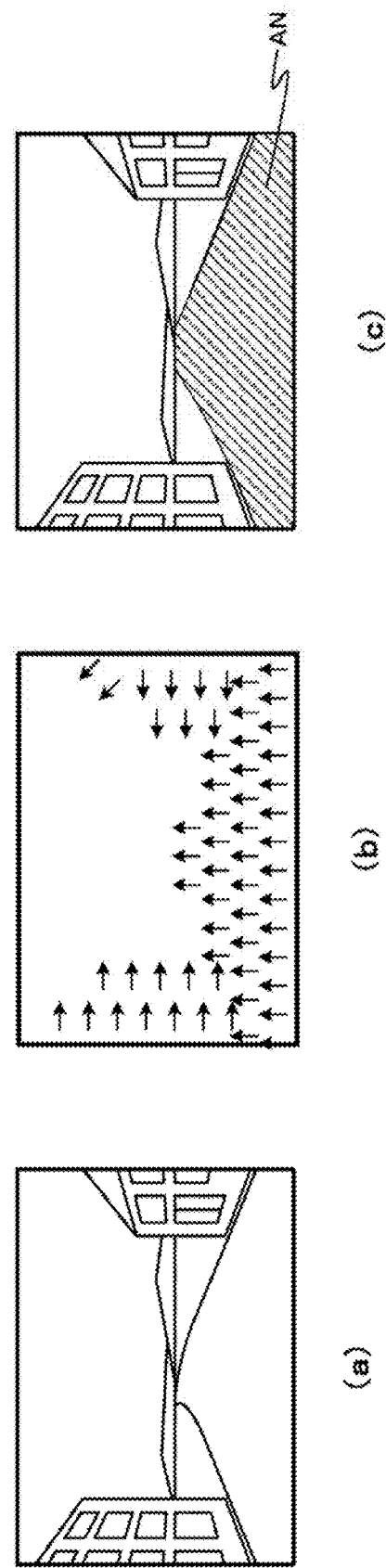
FIG. 10 is a diagram exemplifying an operation of the first embodiment.

FIG. 10 exemplifies an operation of the first embodiment. Also, (a) of FIG. 10 exemplifies the non-polarization image acquired by the image acquisition unit 341-1. Also, (b) of FIG. 10 illustrates, by an arrow, the normal direction detected by the discrimination information generation unit 342-1. The discrimination information generation unit 342-1 generates the analysis object discrimination information indicating the road surface detection result using, as the road surface, a continuous area in which the normal direction is an approximately vertical direction toward the vehicle 80. Also, (c) of FIG. 10 illustrates the image analysis area for performing the image analysis by the image analysis unit 344-1. The image analysis unit 344-1 sets, to an image analysis area AN, an area detected as the road surface or an area obtained by widening the area detected as the road surface from side to side on the basis of the analysis object discrimination information.

According to the first embodiment as described above, since the road surface can be accurately detected, when the image analysis area is set on the basis of the detected road surface, the detection of the obstacle etc. can be efficiently performed.

4. Second Embodiment

Figure 11:
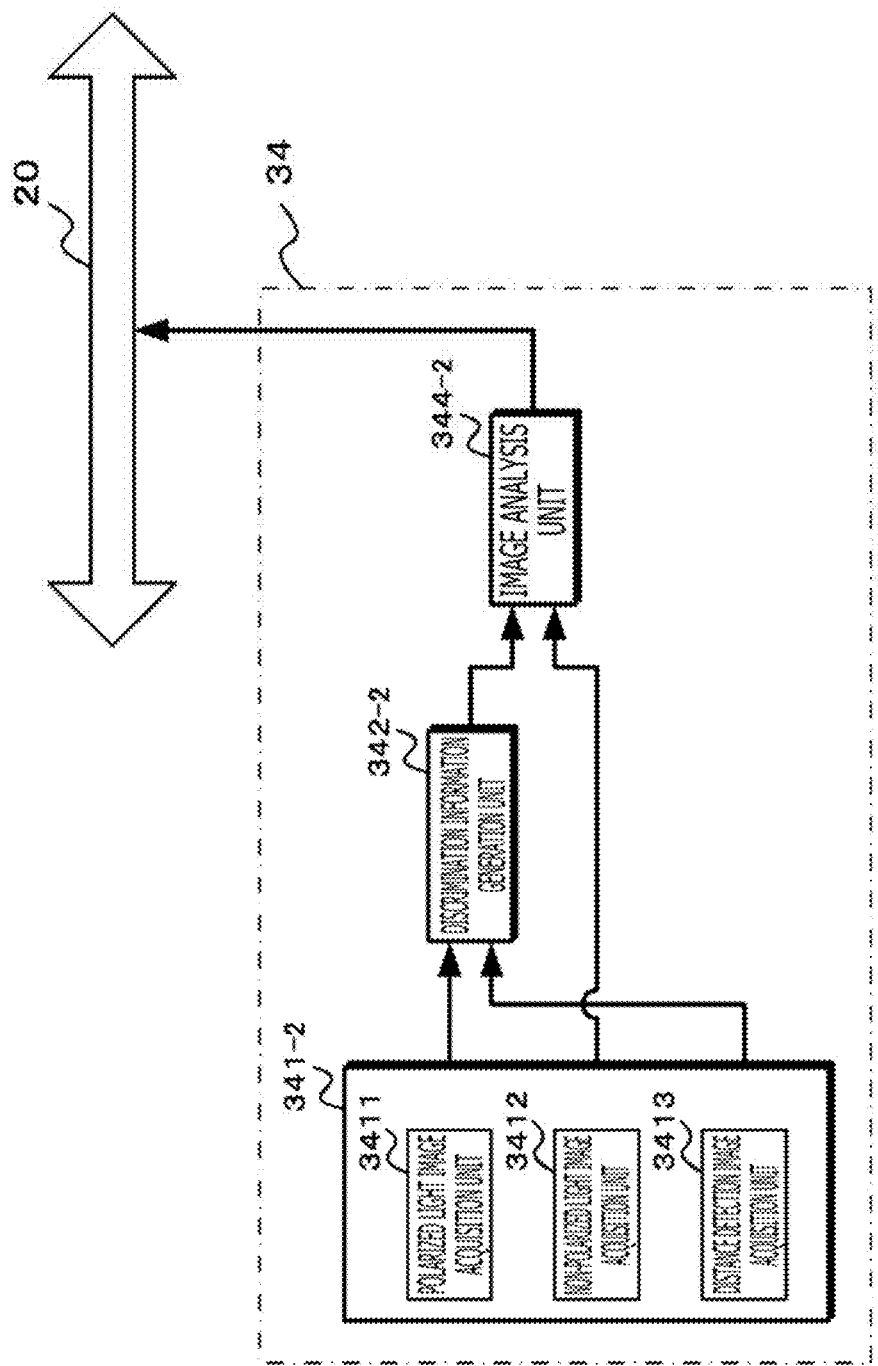
FIG. 11 is a diagram illustrating a configuration of a second embodiment.

FIG. 11 illustrates a configuration of a second embodiment. The outer-vehicle information detection unit 34 includes an image acquisition unit 341-2, a discrimination information generation unit 342-2, and an image analysis unit 344-2. Also, the image acquisition unit 341-2 includes a polarization image acquisition unit 3411 that acquires the polarization image, the non-polarization image acquisition unit 3412 that acquires the non-polarization image, and a distance detection image acquisition unit 3413.

The polarization image acquisition unit 3411 generates the polarization image and outputs the polarization image to the discrimination information generation unit 342 similarly to the first embodiment. The non-polarization image acquisition unit 3412 generates the non-polarization image and outputs the non-polarization image to the image analysis unit 344-2 similarly to the first embodiment.

The distance detection image acquisition unit 3413 acquires an image usable for the detection of a distance and outputs the image to the discrimination information generation unit 342-2. The distance detection image acquisition unit 3413 is, for example, configured by a stereo camera and the like and outputs a right viewpoint image and a left viewpoint image acquired by the distance detection image acquisition unit 3413 to the discrimination information generation unit 342.

Figure 12:
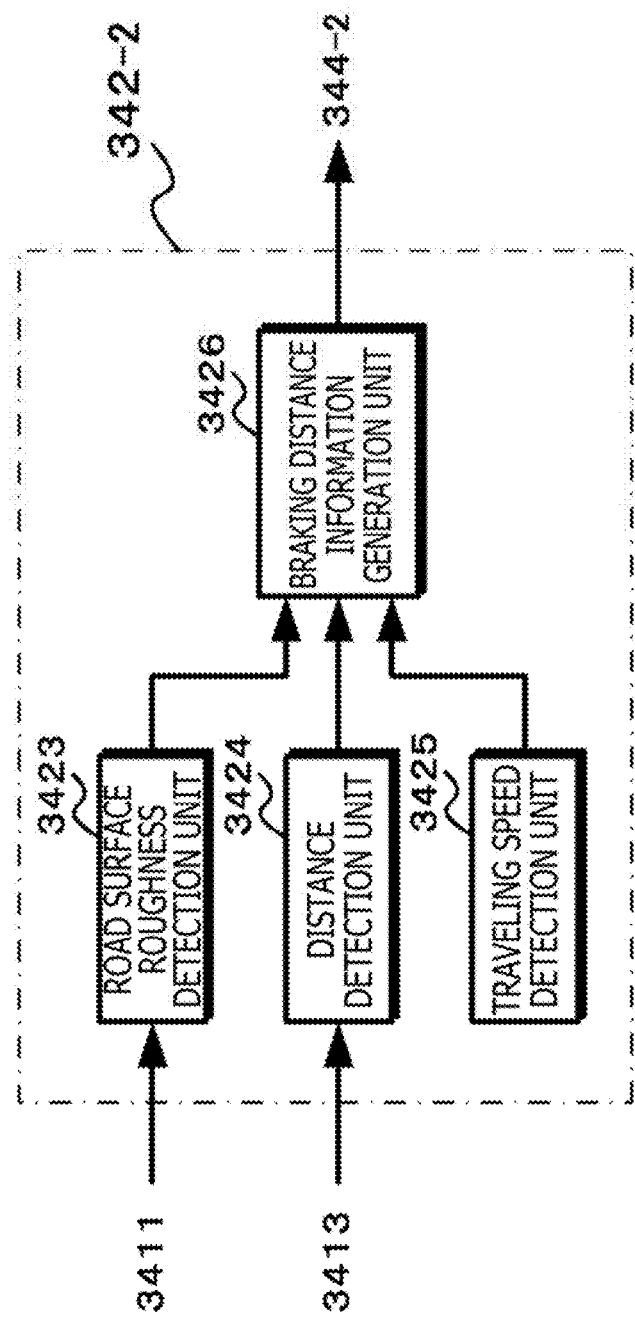
FIG. 12 is a diagram exemplifying a configuration of the discrimination information generation unit.

FIG. 12 exemplifies a configuration of the discrimination information generation unit. The discrimination information generation unit 342-2 includes a road surface roughness detection unit 3423, a distance detection unit 3424, a traveling speed detection unit 3425, and a braking distance information generation unit 3426.

The road surface roughness detection unit 3423 detects a road surface roughness by using the polarization image generated by the polarization image acquisition unit 3411. The road surface roughness detection unit 3423 detects, for example, the road surface roughness from an intensity distribution of horizontal and vertical polarization components in the same manner as in JP 1999-230898A by using a horizontal polarization image and a vertical polarization image generated by the polarization image acquisition unit 3411. The road surface roughness detection unit 3423 outputs a detection result of the road surface roughness to the braking distance information generation unit 3426.

The distance detection unit 3424 detects a distance up to the photographic object positioned in the capturing direction from the image acquired by the distance detection image acquisition unit 3413, for example, the right viewpoint image and the left viewpoint image and outputs the distance information indicating the detection result to the braking distance information generation unit 3426.

The traveling speed detection unit 3425 detects a traveling speed of the vehicle 80 and outputs speed information indicating the detection result to the braking distance information generation unit 3426. In addition, traveling information may be acquired from the vehicle state detection unit 311 connected to the driving system control unit 31.

The braking distance information generation unit 3426 calculates the braking distance of the vehicle 80 on the basis of the road surface roughness detected by the road surface roughness detection unit 3423 and the traveling speed detected by the traveling speed detection unit 3425. Also, the braking distance information generation unit 3426 discriminates a position separated before by the braking distance on the basis of the distance detection result of the distance detection unit 3424 and outputs braking distance information indicating the discrimination result to the image analysis unit 344-2.

The image analysis unit 344-2 performs the image analysis of the image analysis area set on the basis of the analysis object discrimination information generated by the discrimination information generation unit 342-2 on the non-polarization image obtained by the image acquisition unit 341-2. Specifically, the image analysis unit 344-2 performs the image analysis using, as the image analysis area, an area up to a position separated before by the braking distance in the non-polarization image and performs the determination of the obstacle etc.

Figure 13:
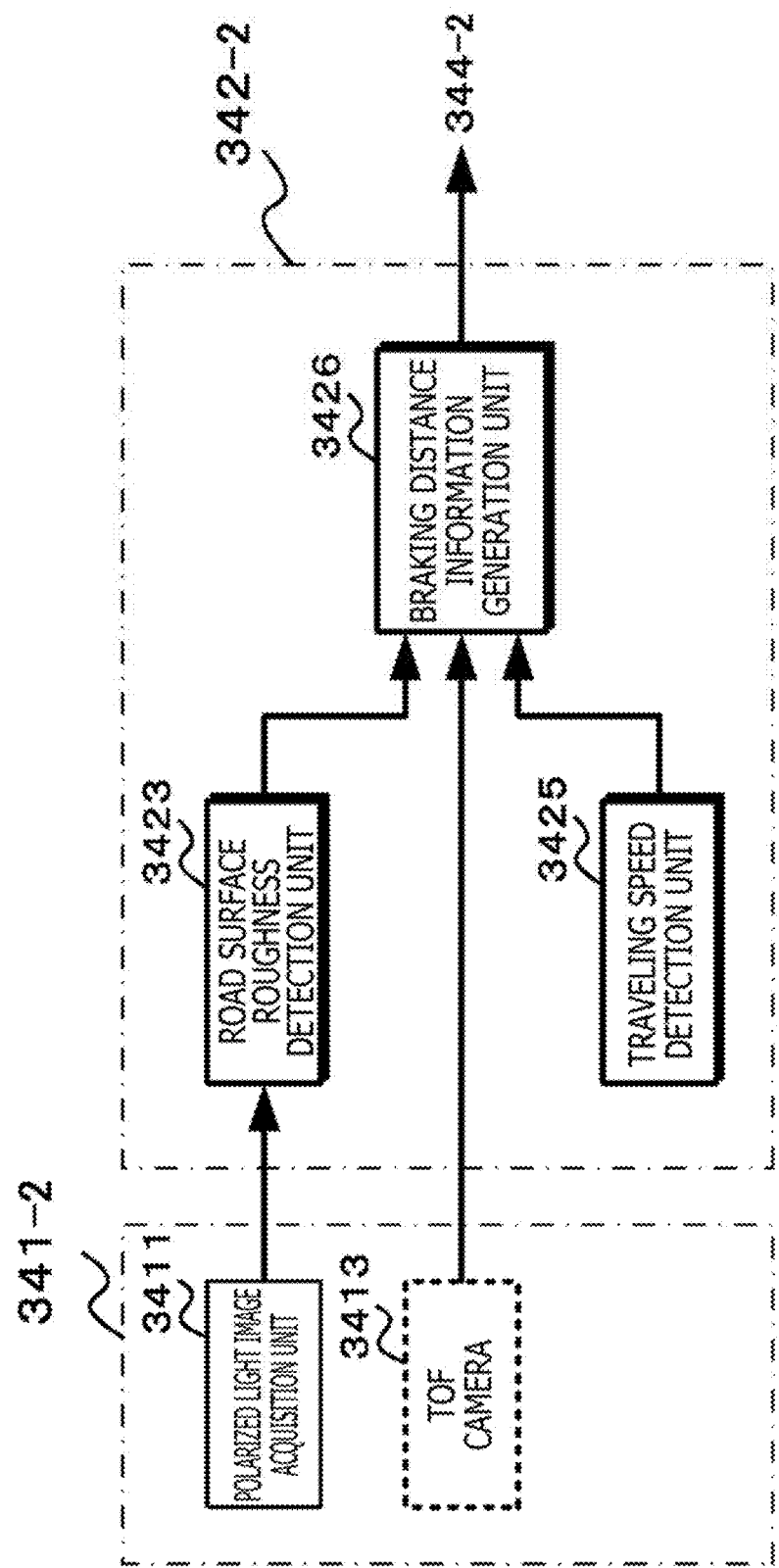
FIG. 13 is a diagram illustrating a configuration of the discrimination information generation unit in a case of using a TOF camera.

Also, in a case where a TOF camera is, for example, used in the distance detection image acquisition unit 3413, the discrimination information generation unit 342-2 takes a configuration illustrated in FIG. 13. In this case, the braking distance information generation unit 3426 calculates the braking distance of the vehicle 80 on the basis of the road surface roughness detected by the road surface roughness detection unit 3423 and the traveling speed detected by the traveling speed detection unit 3425. Also, the braking distance information generation unit 3426 discriminates a position separated before by the braking distance on the basis of the distance information acquired by the TOF camera and outputs the braking distance information indicating the discrimination result to the image analysis unit 344-2.

In the second embodiment configured as described above, processing is performed similarly to the flowchart illustrated in FIG. 9 and the analysis object discrimination information indicating a position separated by the braking distance is generated in the generation of the analysis object discrimination information. Also, in the image analysis, an area up to a position separated before by the braking distance in the non-polarization image is set to the image analysis area.

Figure 14:
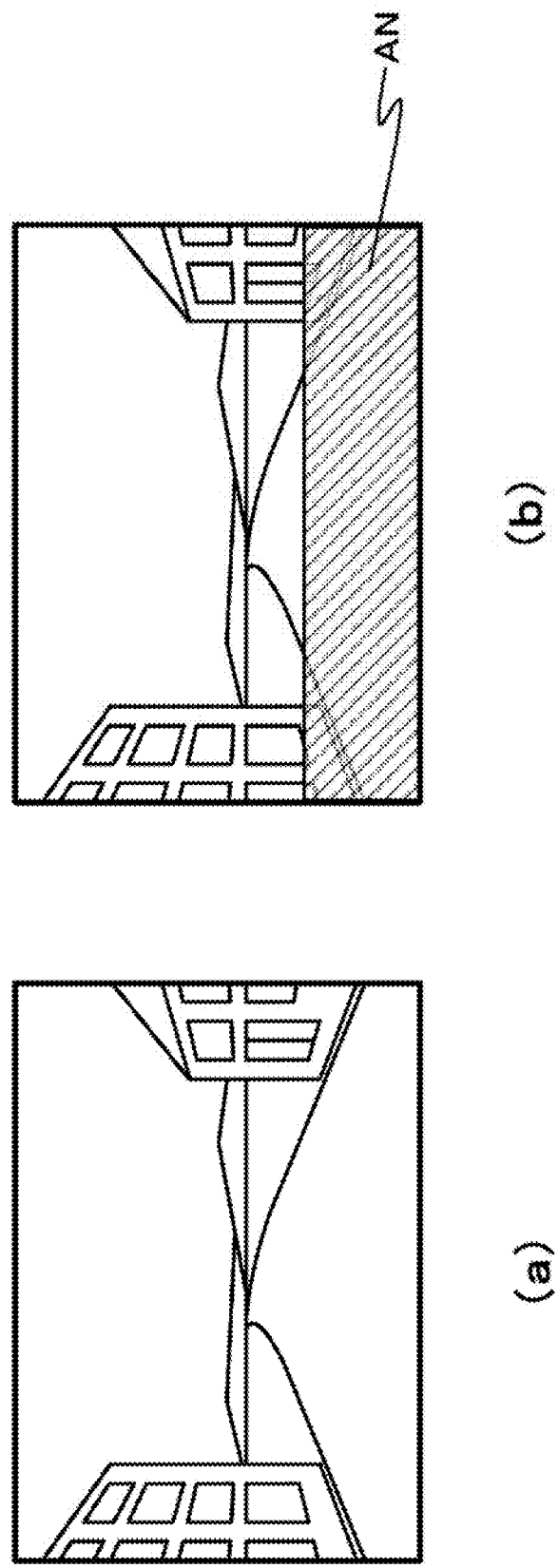
FIG. 14 is a diagram exemplifying an operation of the second embodiment.

FIG. 14 exemplifies an operation of the second embodiment. Also, (a) of FIG. 14 exemplifies the non-polarization image acquired by the image acquisition unit 341-2. Also, (b) of FIG. 14 exemplifies the image analysis area in which the image analysis is performed by the image analysis unit 344-2. The image analysis unit 344-2 sets, to the image analysis area AN, an area up to a position separated before by the braking distance on the basis of the analysis object discrimination information.

According to the second embodiment as described above, the image analysis area can be set in accordance with the braking distance and therefore the obstacle etc. that need to be immediately detected can be efficiently detected.

5. Third Embodiment

A third embodiment is configured as a case in which the first and second embodiments are combined.

Figure 15:
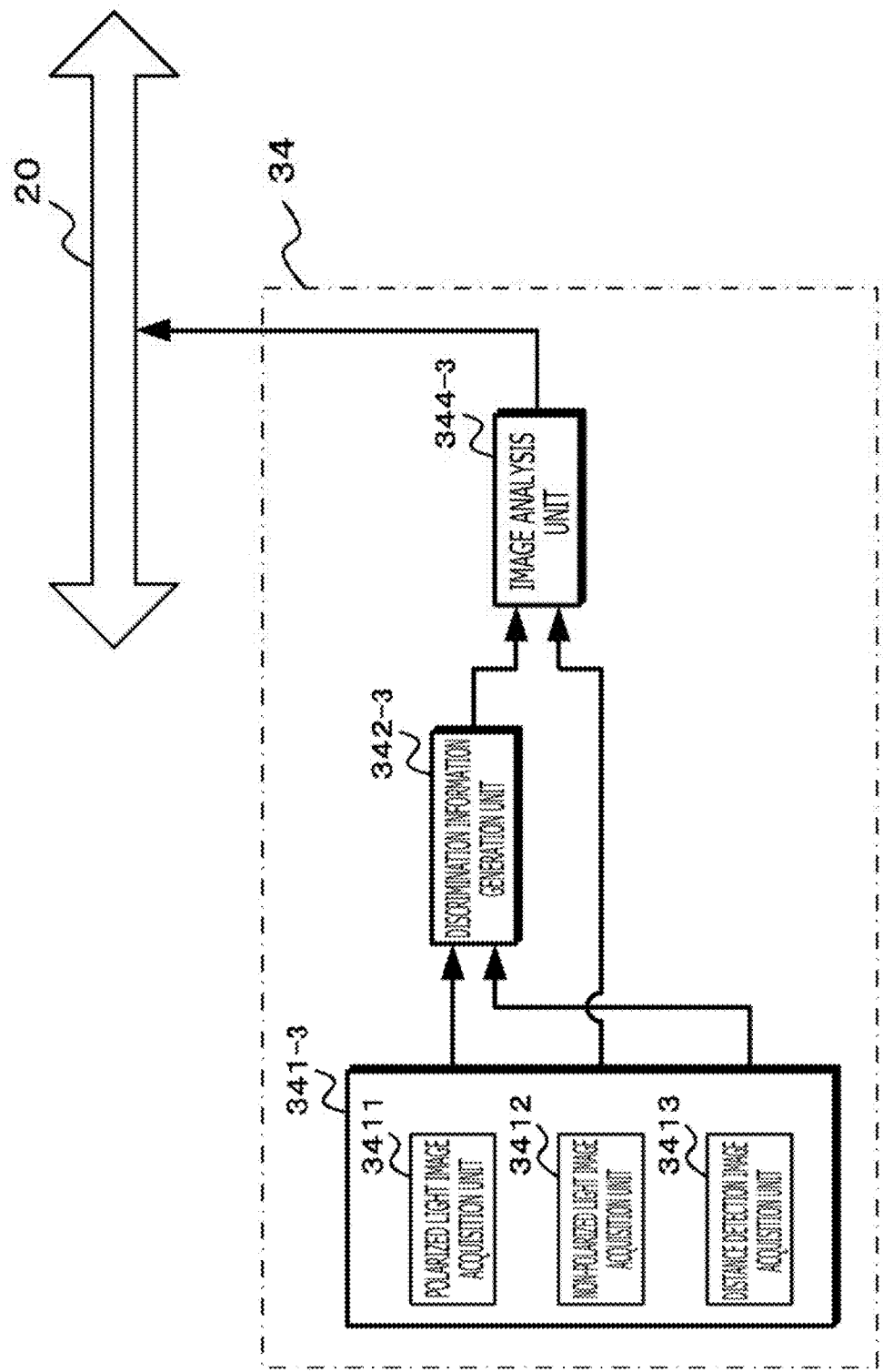
FIG. 15 is a diagram illustrating a configuration of a third embodiment.

FIG. 15 illustrates a configuration of the third embodiment. The outer-vehicle information detection unit 34 includes an image acquisition unit 341-3, a discrimination information generation unit 342-3, and an image analysis unit 344-3. Also, the image acquisition unit 341-3 includes a polarization image acquisition unit 3411 that acquires the polarization image, the non-polarization image acquisition unit 3412 that acquires the non-polarization image, and the distance detection image acquisition unit 3413.

Figure 16:
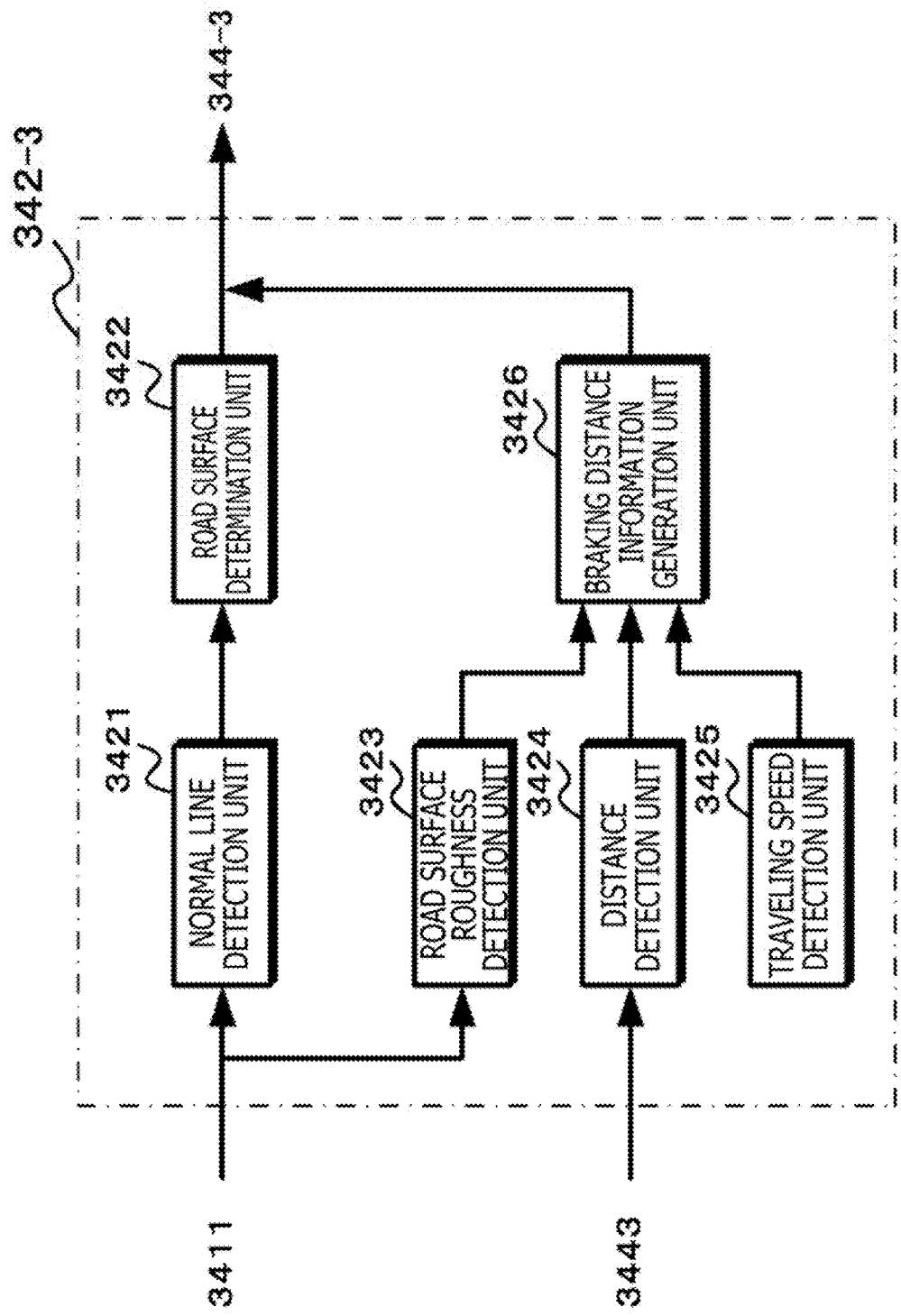
FIG. 16 is a diagram exemplifying a configuration of the discrimination information generation unit.

FIG. 16 exemplifies a configuration of the discrimination information generation unit. The discrimination information generation unit 342-3 includes the normal line detection unit 3421, the road surface determination unit 3422, the road surface roughness detection unit 3423, the distance detection unit 3424, the traveling speed detection unit 3425, and the braking distance information generation unit 3426.

The normal line detection unit 3421 detects a normal line from the plurality of polarization images different in the polarization direction acquired by the polarization image acquisition unit 3411. The road surface determination unit 3422 detects the road surface on the basis of the normal line detection result from the normal line detection unit 3421 and outputs, as the analysis object discrimination information, the detection result of the road surface to the image analysis unit 344-3.

The road surface roughness detection unit 3423 performs the detection of the road surface roughness by using the polarization image generated by the polarization image acquisition unit 3411 and outputs the detection result to the braking distance information generation unit 3426. The distance detection unit 3424 performs the detection of a distance by using the image acquired by the distance detection image acquisition unit 3413 and outputs the distance information indicating the detection result to the braking distance information generation unit 3426. The traveling speed detection unit 3425 detects the traveling speed of the vehicle 80 and outputs the speed information indicating the detection result to the braking distance information generation unit 3426.

The braking distance information generation unit 3426 calculates the braking distance of the vehicle 80 on the basis of the road surface roughness detected by the road surface roughness detection unit 3423 and the traveling speed detected by the traveling speed detection unit 3425. Also, the braking distance information generation unit 3426 outputs the braking distance information indicating a position separated before by the braking distance to the image analysis unit 344-3 on the basis of the calculated braking distance and the distance information generated by the distance detection unit 3424 or the TOF camera.

The image analysis unit 344-3 performs the image analysis of the image analysis area set on the basis of the analysis object discrimination information generated by the discrimination information generation unit 342-3 on the non-polarization image obtained by the image acquisition unit 341-3. Specifically, the image analysis unit 344-3 performs the image analysis using, as the image analysis area, an area that is detected as the road surface and that is up to a position separated before by the braking distance on the non-polarization image and performs the determination of the obstacle etc. In addition, in order to facilitate detection of the obstacle positioned at the end of the road surface, the image analysis unit 344-3 may set the image analysis area to be widened in the horizontal direction on the basis of the area detected as the road surface.

In the third embodiment configured as described above, the processing is performed similarly to the flowchart illustrated in FIG. 9, and the road surface detection result and the analysis object discrimination information indicating a position separated by the braking distance are generated in the generation of the analysis object discrimination information. Also, in the image analysis, an area that is detected as the road surface and that is up to a position separated before by the braking distance on the non-polarization image is set to the image analysis area.

Figure 17:
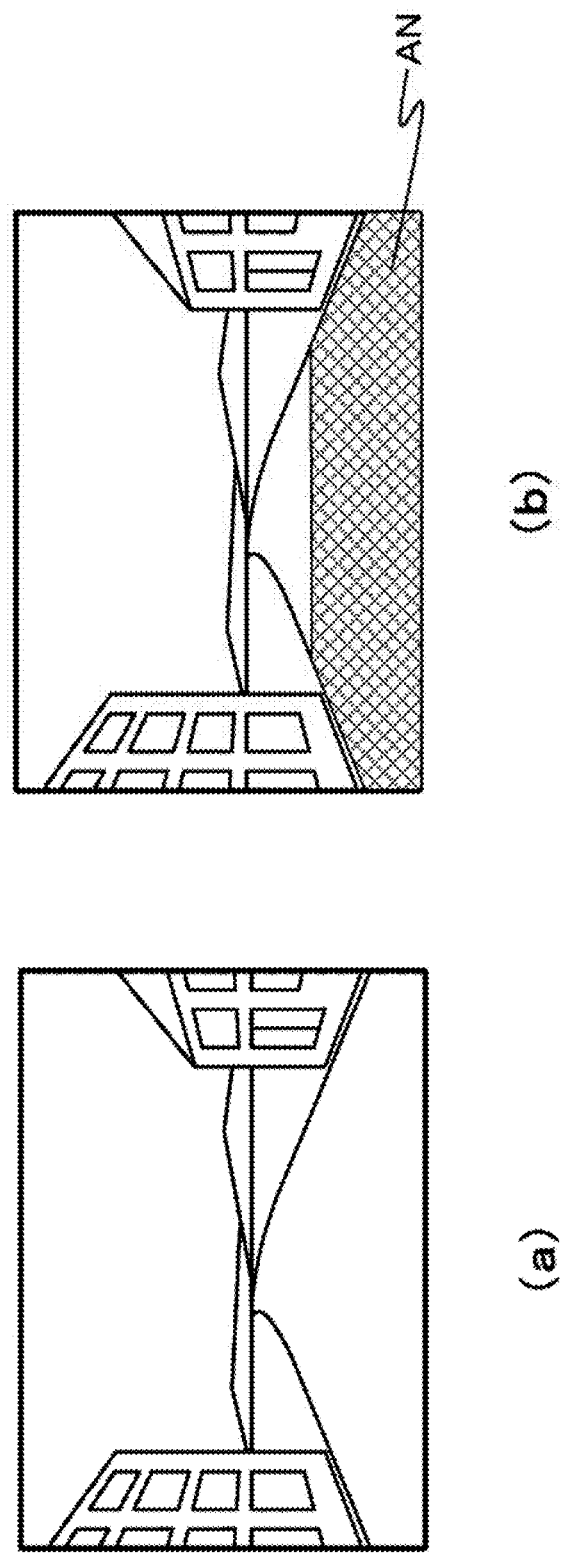
FIG. 17 is a diagram exemplifying an operation of the third embodiment.

FIG. 17 exemplifies an operation of the third embodiment. Also, (a) of FIG. 17 exemplifies the non-polarization image acquired by the image acquisition unit 341-3. Also, (b) of FIG. 17 exemplifies the image analysis area in which the image analysis is performed by the image analysis unit 344-3. On the basis of the analysis object discrimination information, the image analysis unit 344-3 sets, to the image analysis area AN, an area that is detected as the road surface and that is up to a position separated before by the braking distance.

According to the third embodiment as described above, the image analysis area can be set to the road surface in accordance with the braking distance and therefore the obstacle etc. that need to be immediately detected on the road surface can be efficiently detected.

6. Fourth Embodiment

Meanwhile, possibly, when it takes time for processing performed in the image analysis unit, the obstacle etc. on the road surface cannot be detected in real time during traveling of the vehicle. Also, when the detection of the obstacle etc. is performed even in other positions regardless of the road surface, the traveling can be performed more safely. In order to solve problems, in a fourth embodiment, a case in which the image analysis unit is provided in plurality will be described.

Figure 18:
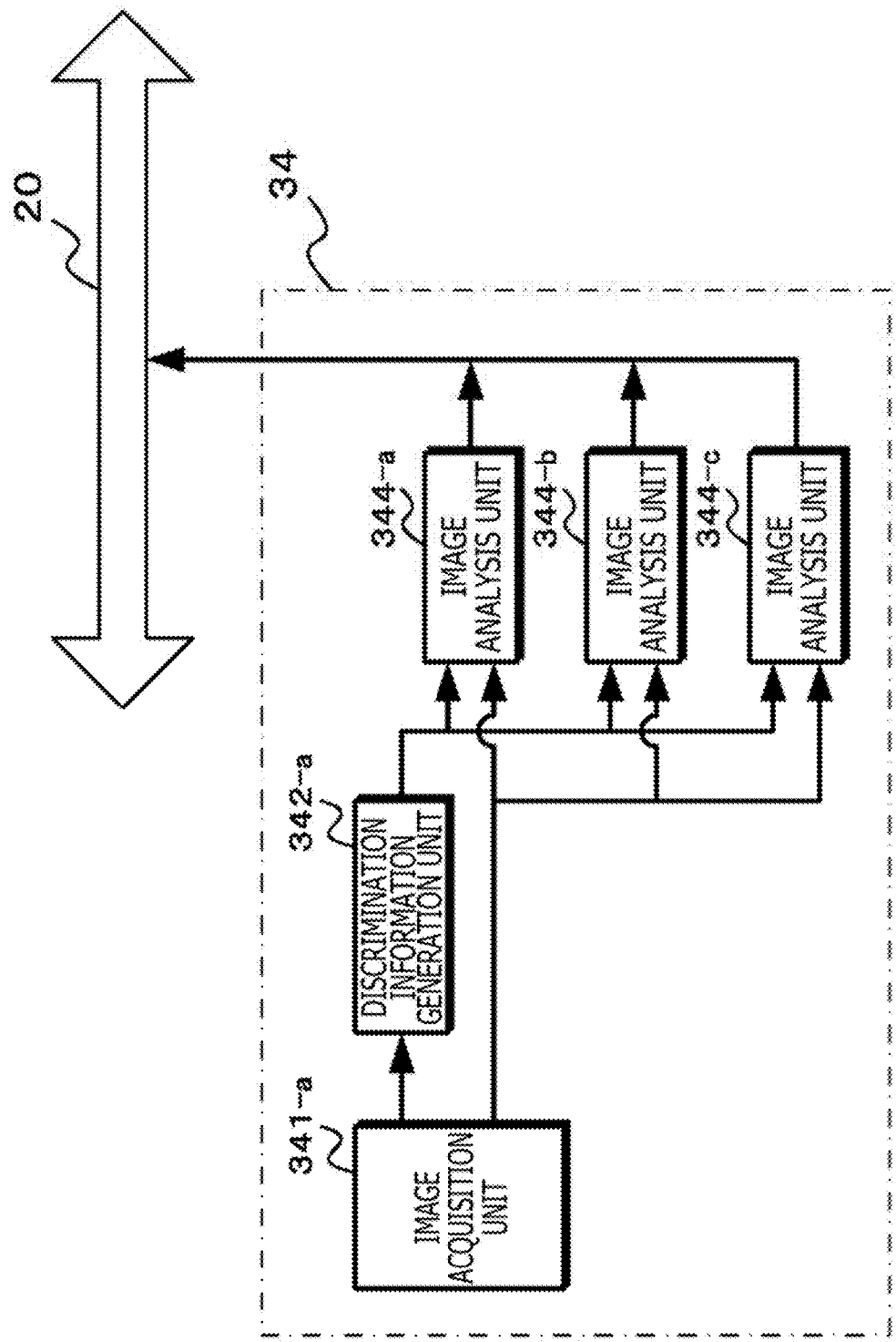
FIG. 18 is a diagram exemplifying a configuration of a fourth embodiment.

FIG. 18 is a diagram exemplifying a configuration of the fourth embodiment and three image analysis units are provided. The outer-vehicle information detection unit 34 includes an image acquisition unit 341-a, a discrimination information generation unit 342-a, and image analysis units 344-a, 344-b, and 344-c.

The image acquisition unit 341-a and the discrimination information generation unit 342-a are configured similarly to any of the foregoing first to third embodiments.

The image analysis units 344-a, 344-b, and 344-c perform an area division on the basis of the analysis object discrimination information generated by the discrimination information generation unit 342-*a* and perform the image analysis of a division area on the non-polarization image acquired by the non-polarization image acquisition unit while being shared by the plurality of image analysis units.

In the fourth embodiments configured as described above, the processing is performed similarly to the flowchart illustrated in FIG. 9 and, in the image analysis, the non-polarization image is divided on the basis of the analysis object discrimination information and the image analysis of the division area is performed while being shared by the plurality of image analysis units.

Figure 19:
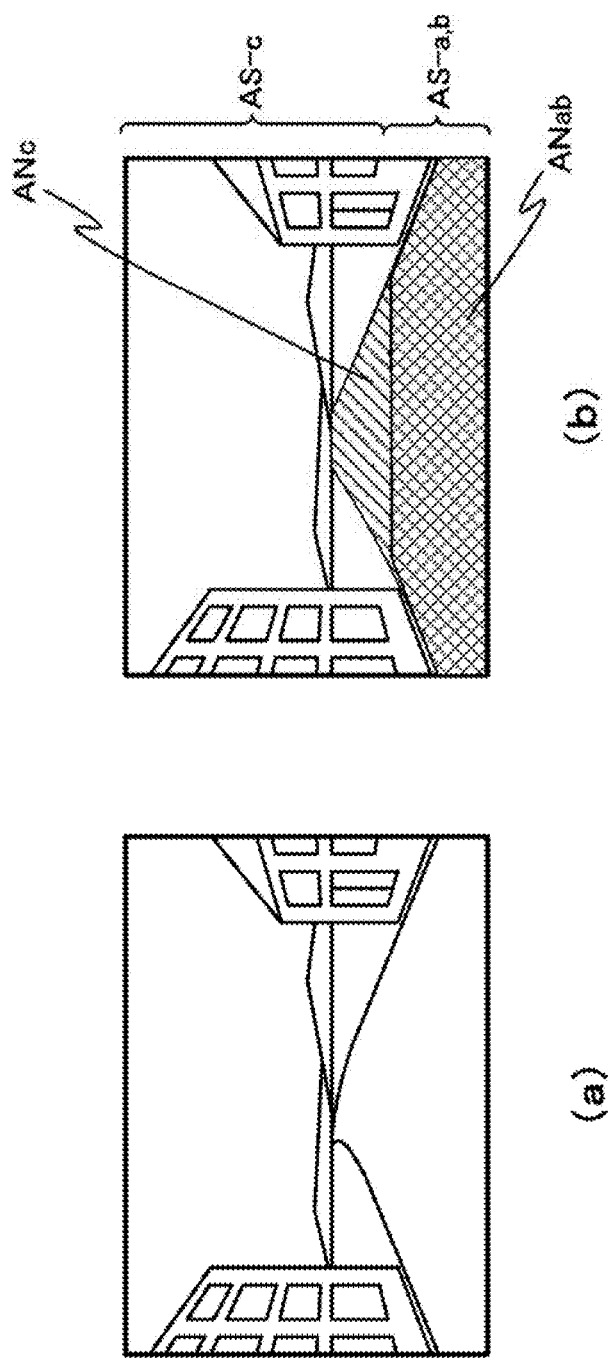
FIG. 19 is a diagram exemplifying an operation of the fourth embodiment.

FIG. 19 exemplifies an operation of the fourth embodiment. Also, (a) of FIG. 19 exemplifies the non-polarization image acquired by the image acquisition unit 341-*a*. Also, (b) of FIG. 19 exemplifies the image analysis area in which the image analysis is performed by the image analysis units 344-*a* to 344-*c*. On the basis of the analysis object discrimination information, the image analysis units 344-*a* and 344-*b* perform the image analysis of an image analysis area ANab in an area AS-ab up to a position separated before by the braking distance. Also, the image analysis unit 344-*c* performs the image analysis of an image analysis area ANc in a remaining area AS-c different from the area AS-ab.

According to the fourth embodiment as described above, the image analysis can be performed while being shared by the plurality of image analysis units, and therefore the obstacle etc. on the road surface can be further efficiently detected. Also, when more image analysis units are allocated to the image analysis area in an area up to a position separated before by the braking distance, detection of the obstacle having high immediacy can be further efficiently performed.

7. Fifth Embodiment

In the foregoing first to fourth embodiments, a case in which the image analysis unit is provided in the outer-vehicle information detection unit 34 is exemplified; however, not limited to the outer-vehicle information detection unit 34, the image analysis may be performed by other control units. In this case, the outer-vehicle information detection unit 34 outputs the non-polarization image to the other control units via the communication network 20. Also, possibly, since a communication speed of the communication network 20 is determined by the standard, when there increases a data amount of the image transferred from the outer-vehicle information detection unit 34 to the other control units that perform the image analysis, it takes time for the transfer and therefore communication between the other control units cannot be promptly performed. Accordingly, in the captured image, the outer-vehicle information detection unit 34 outputs only an image of an area as an object of the image analysis to the other control units. Hereinafter, a case in which the image analysis is performed by the integrated control unit 40 will be described.

Figure 20:
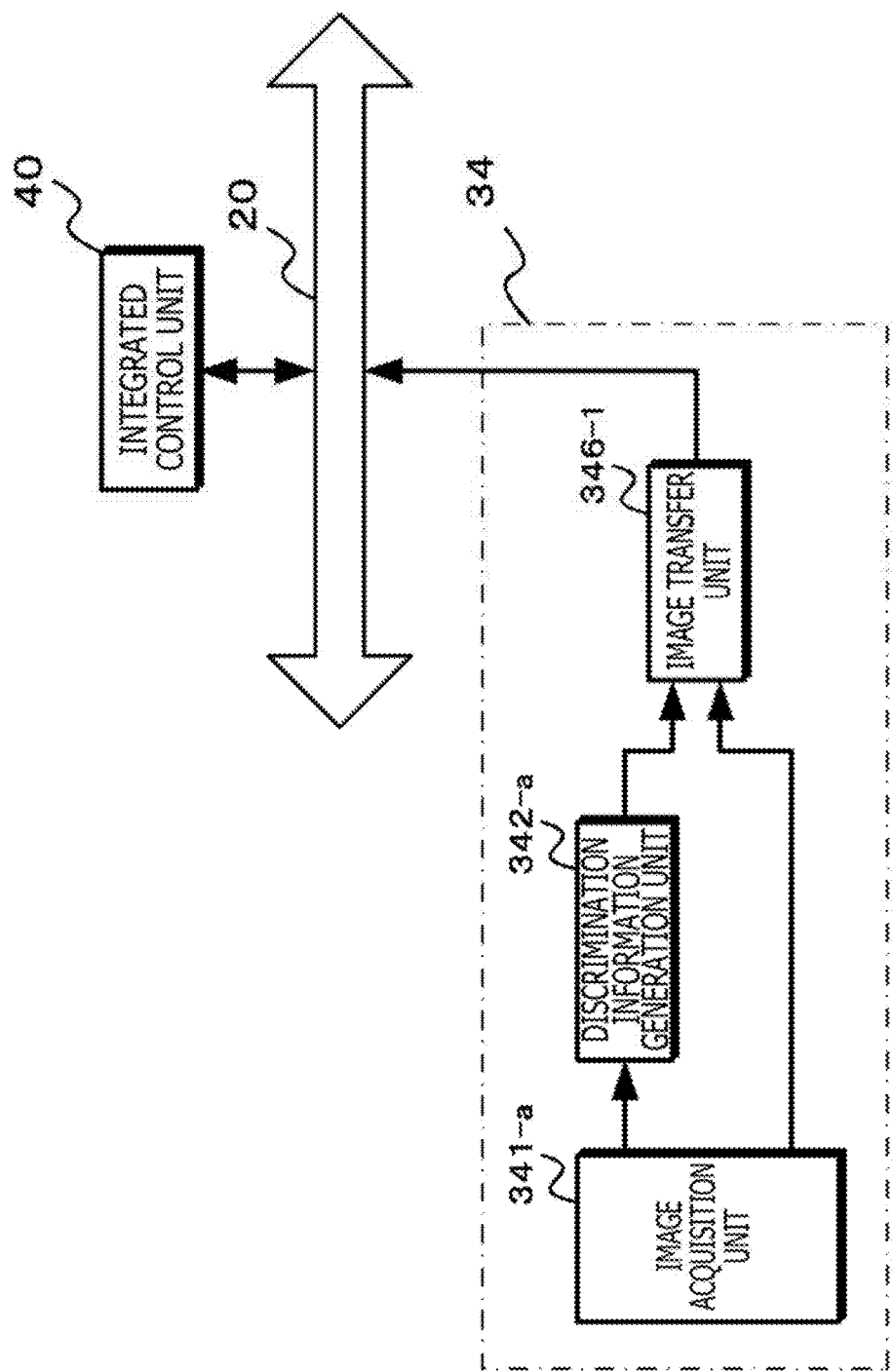
FIG. 20 is a diagram exemplifying a configuration of a fifth embodiment.

FIG. 20 exemplifies a configuration of a fifth embodiment. The outer-vehicle information detection unit 34 includes the image acquisition unit 341-*a*, the discrimination information generation unit 342-*a*, and an image transfer unit 346-1. The image acquisition unit 341-*a* and the discrimination information generation unit 342-*a* are configured similarly to any of the foregoing first to third embodiments.

The image acquisition unit 341-*a* generates the polarization image etc. and outputs the polarization image etc. to the discrimination information generation unit 342-*a*. Also, the image acquisition unit 341-*a* generates the non-polarization image and outputs the non-polarization image to the image transfer unit 346-1. The discrimination information generation unit 342-*a* generates the analysis object discrimination information by using the polarization image etc. supplied from the image acquisition unit 341-*a* and outputs the analysis object discrimination information to the image transfer unit 346-1.

On the basis of the analysis object discrimination information supplied from the discrimination information generation unit 342-*a*, the image transfer unit 346-1 sets the image analysis area in which the image analysis is performed on the non-polarization image supplied from the image acquisition unit 341-*a*. Also, the image transfer unit 346-1 transfers the set image of the image analysis area to the integrated control unit 40 via the communication network 20. The integrated control unit 40 performs the image analysis by using the image supplied from the outer-vehicle information detection unit 34 and performs the detection of the obstacle etc. In addition, in a case where the transfer of the image is performed in units of lines, the image transfer unit 346-1 transfers the image of lines including the image analysis area.

For example, in a case where the analysis object discrimination information supplied from the discrimination information generation unit 342-*a* indicates the road surface detection result, the image transfer unit 346-1 sets, to the image analysis area, the area detected as the road surface and transfers the image of the image analysis area to the integrated control unit 40. Also, in a case where the analysis object discrimination information supplied from the discrimination information generation unit 342-*a* indicates the road surface detection result, the image transfer unit 346-1 sets an area within the braking distance to the image analysis area and transfers the image of the image analysis area to the integrated control unit 40 via the communication network 20.

Further, the analysis object discrimination information supplied from the discrimination information generation unit 342-*a* indicates the road surface detection result and the braking distance information, the image transfer unit 346-1 sets, to the image analysis area, an area etc. that are present within the braking distance and are detected as the road surface. The image transfer unit 346-1 transfers the image of the image analysis area to the integrated control unit 40 via the communication network 20.

Figure 21:
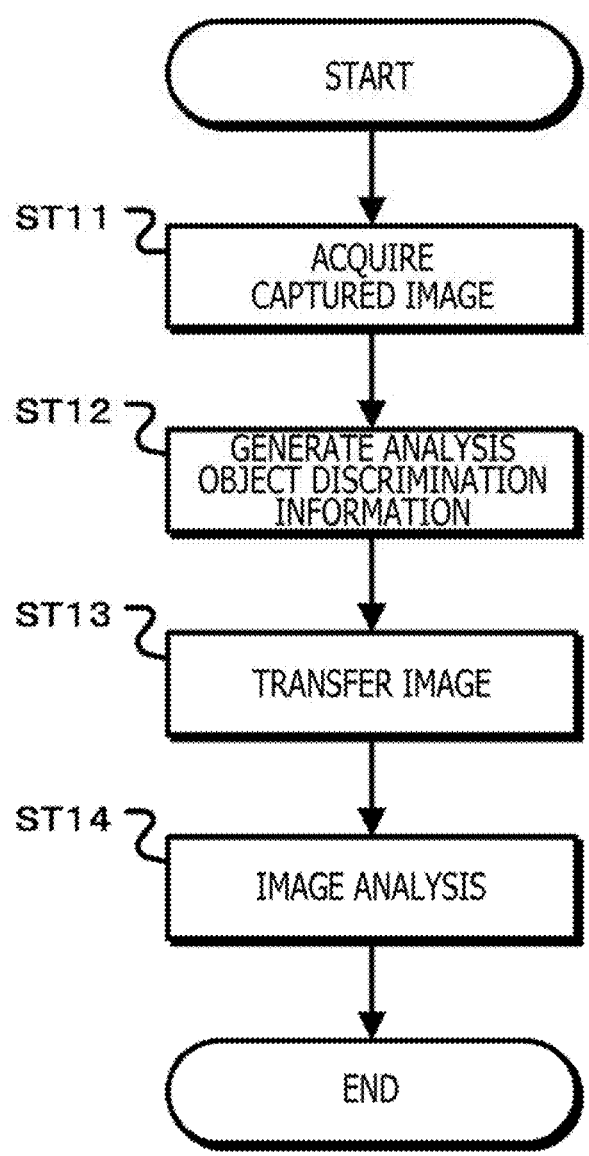
FIG. 21 is a flowchart exemplifying an operation of the fifth embodiment.

FIG. 21 is a flowchart exemplifying an operation of the fifth embodiment. In step ST11, the outer-vehicle information detection unit 34 acquires the captured image. The image acquisition unit 341-*a* of the outer-vehicle information detection unit 34 acquires the polarization image and non-polarization image obtained by capturing the peripheral area of the vehicle 80 and proceeds to step ST12.

In step ST12, the outer-vehicle information detection unit 34 generates the analysis object discrimination information. The discrimination information generation unit 342-*a* of the outer-vehicle information detection unit 34 generates the analysis object discrimination information on the basis of the polarization image acquired in step ST11 and proceeds to step ST13.

In step ST13, the outer-vehicle information detection unit 34 transfers the image. The image transfer unit 346-1 of the outer-vehicle information detection unit 34 transfers the image of the image analysis area set on the basis of the analysis object discrimination information generated in step ST12 relative to the non-polarization image acquired in step ST11 to the integrated control unit 40 via the communication network 20 and proceeds to step ST14.

In step ST14, the integrated control unit 40 performs the image analysis. The image analysis unit of the integrated control unit 40 performs the image analysis by using the non-polarization image transmitted from the outer-vehicle information detection unit 34 in step ST13.

According to the fifth embodiment as described above, in a case where the image analysis is performed by the other control units etc. connected via the outer-vehicle information detection unit and the communication network, an image of the area in which the image analysis is performed is transmitted via the communication network 20. Accordingly, the data amount to be transferred can be reduced as compared with a case in which the whole non-polarization image is transferred.

8. Sixth Embodiment

In a sixth embodiment, a case in which the image acquisition unit that captures different peripheral areas is provided is exemplified. For example, a case in which the image acquisition units 341A, 341C, 341D, and 341E illustrated in FIG. 2 are provided will be described.

Figure 22:
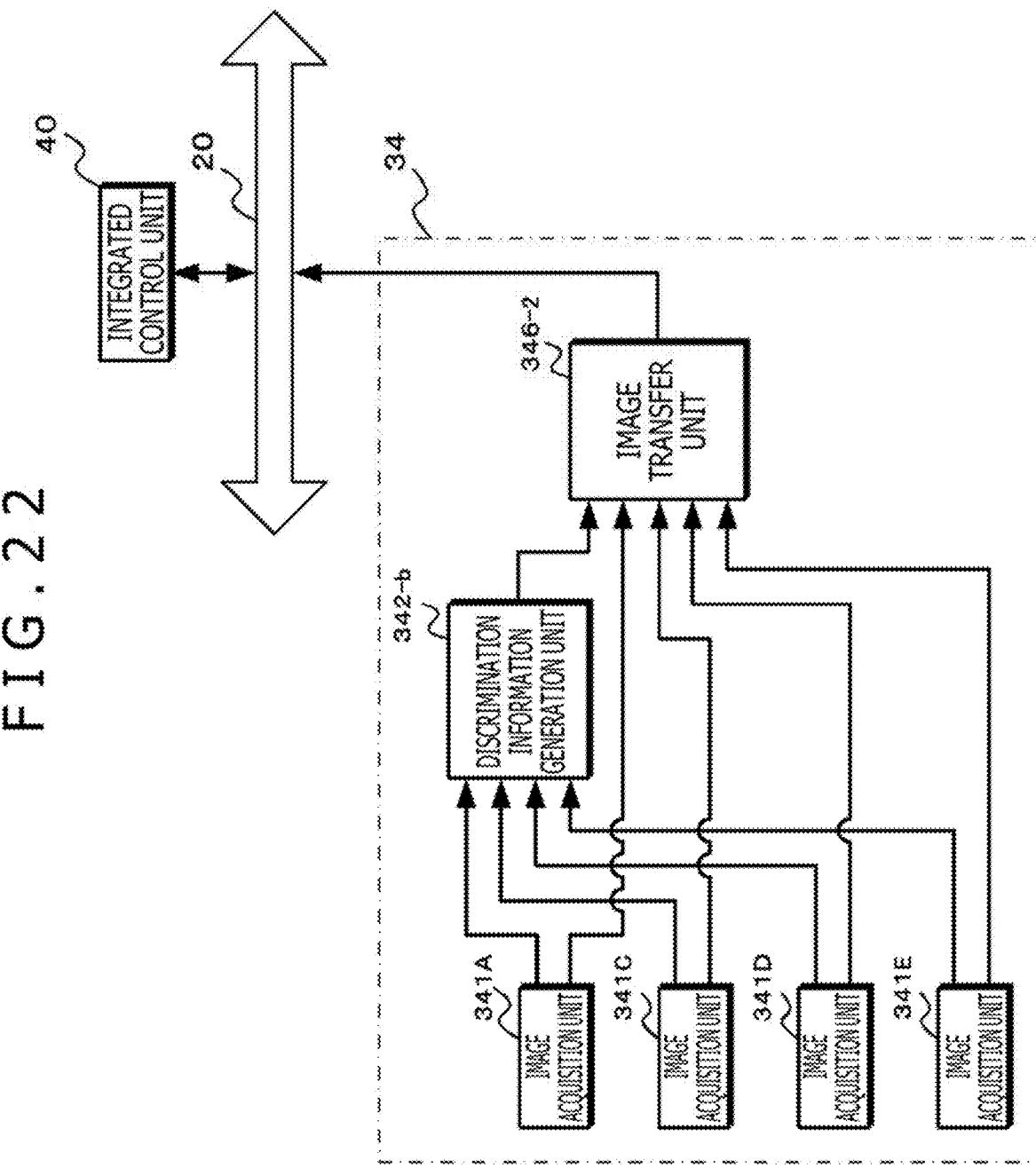
FIG. 22 is a diagram exemplifying a configuration of a sixth embodiment.

FIG. 22 exemplifies a configuration of the sixth embodiment. The outer-vehicle information detection unit 34 includes the image acquisition units 341A, 341C, 341D, and 341E, a discrimination information generation unit 342-b, and an image transfer unit 346-2. The image acquisition units 341A, 341C, 341D, and 341E correspond to the image acquisition unit 341-a according to the fifth embodiment described using FIG. 20. The discrimination information generation unit 342-b provides the function of the discrimination information generation unit 342-a according to the fifth embodiment for each of the image acquisition units 341A, 341C, 341D, and 341E.

The image acquisition units 341A, 341C, 341D, and 341E generate the polarization image etc. and output the polarization image etc. to the discrimination information generation unit 342-b. Also, the image acquisition units 341A, 341C, 341D, and 341E generate the non-polarization image and output the non-polarization image to the image transfer unit 346-2.

For each of the image acquisition units 341A, 341C, 341D, and 341E, the discrimination information generation unit 342-b generates the analysis object discrimination information by using the polarization image etc. supplied from the image acquisition unit and outputs the analysis object discrimination information to the image transfer unit 346-2.

On the basis of the analysis object discrimination information supplied from the discrimination information generation unit 342-b, the image transfer unit 346-2 discriminates, as an image to be transferred, the non-polarization image on which the image analysis is performed. On the basis of the analysis object discrimination information, for example, the image transfer unit 346-2 sets the non-polarization image in which the road surface is detected to an image to be transferred. Also, in a case where the braking distance is longer than a determined distance, the image transfer unit 346-2 may set the non-polarization image before and after the traveling direction to an image to be transferred. The image transfer unit 346-2 transfers the discriminated image to be transferred along with the analysis object discrimination information to the integrated control unit 40 via the communication network 20. Also, on the basis of the received image and analysis object discrimination information, the image analysis unit of the integrated control unit 40 performs the image analysis by using the image of the image analysis area.

In the sixth embodiment configured as described above, the processing is performed similarly to the flowchart illustrated in FIG. 21; further, in the transfer of the image, the non-polarization image including the image analysis area based on the analysis object discrimination information is transferred along with analysis area discrimination information.

Figure 23:
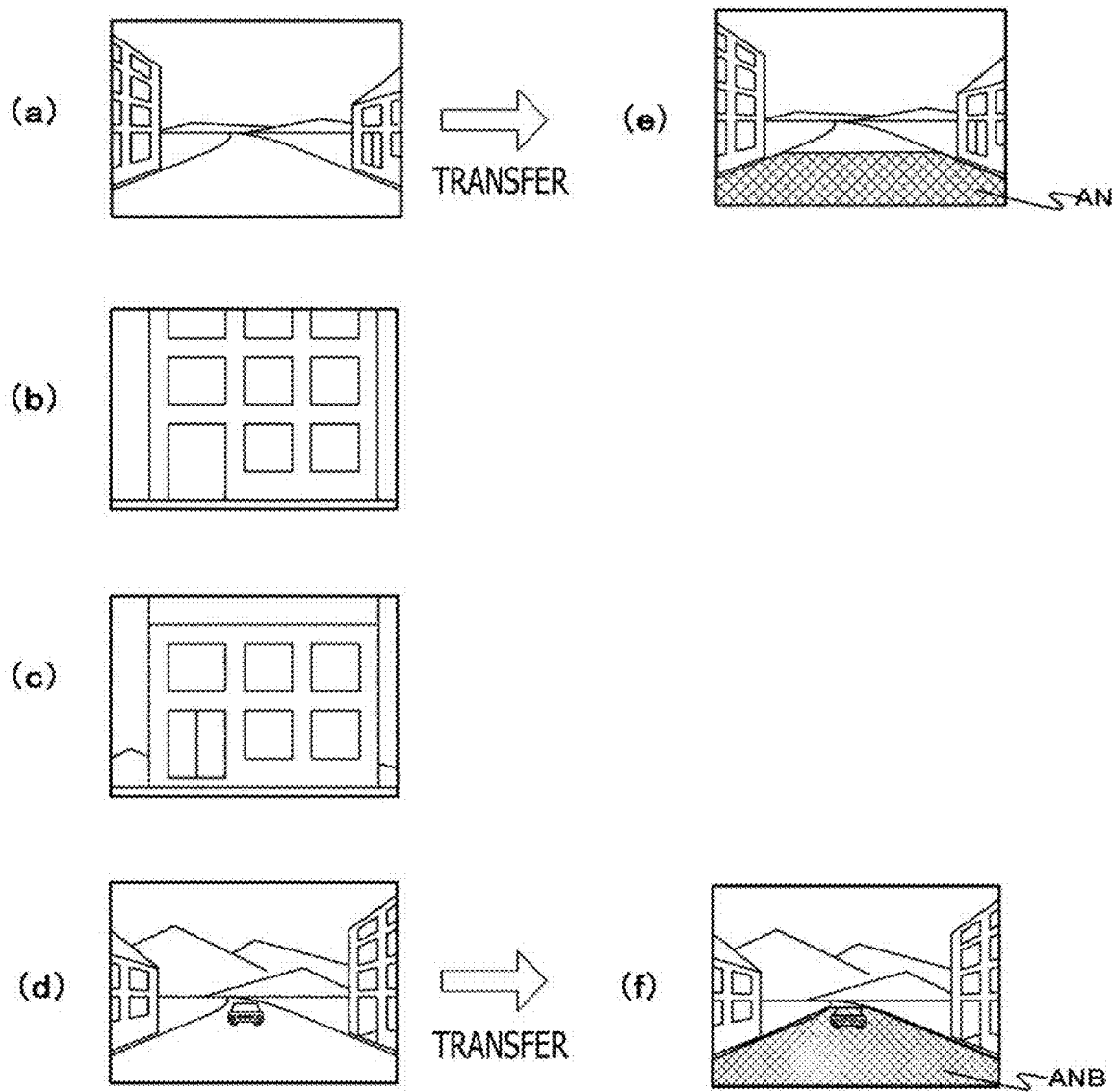
FIG. 23 is a diagram exemplifying an operation of the sixth embodiment.

FIG. 23 exemplifies an operation of the sixth embodiment. Also, (a) of FIG. 23 exemplifies the non-polarization image acquired by the image acquisition unit 341A. Also, (b), (c), and (d) of FIG. 23 individually exemplify the non-polarization images acquired by the image acquisition units 341C, 341D, and 341E. Here, it is assumed in the images acquired by the image acquisition units 341A and 341E that the road surface is detected and the braking distance is calculated. Also, it is assumed in the images acquired by the image acquisition units 341C and 341D that the road surface is not detected. In this case, the image transfer unit 346 transfers, as the image to be transferred, the images in which positions of the road surface and the braking distance are indicated, specifically, the non-polarization images acquired by the image acquisition units 341A and 341E along with the analysis object discrimination information to the integrated control unit 40 via the communication network 20. On the basis of the received image and analysis object discrimination information, the image analysis unit of the integrated control unit 40 performs the image analysis in the image analysis areas AN and ANB as illustrated in (e) and (f) of FIG. 23. When performing such processing, it is possible to detect, by the image analysis, the obstacle that is present near on the road surface as compared with the braking distance or the following vehicle in which a distance between two cars is shorter than the braking distance.

According to the sixth embodiment as described above, in a case where the image analysis is performed by the other control units etc. connected via the outer-vehicle information detection unit and the communication network, only images in which the image analysis is performed on the non-polarization images generated by the plurality of image acquisition units are transmitted via the communication network 20. Therefore, the data mount to be transferred can be reduced as compared with a case in which all images of the non-polarization images generated by respective image acquisition units are transferred.

9. Seventh Embodiment

In the foregoing sixth embodiment, the image to be transferred discriminated on the basis of the analysis object discrimination information is transferred to the integrated control unit 40 via the communication network 20; further, the images of the image analysis areas in the images to be transferred may be transferred similarly to the foregoing fifth embodiment. In a seventh embodiment, a case in which the images of the image analysis areas in the images to be transferred are transferred to the integrated control unit 40 via the communication network 20 will be described.

In the seventh embodiment, the outer-vehicle information detection unit 34 is configured similarly to the sixth embodiment. Here, on the basis of the analysis object discrimination information supplied from the discrimination information generation unit 342-b, the image transfer unit 346-2 discriminates, as the image to be transferred, the non-polarization image on which the image analysis is performed. On the basis of the analysis object discrimination information, for example, the image transfer unit 346-2 sets, to the image to be transferred, the non-polarization image in which the road surface is detected. Also, where the braking distance is longer than the determined distance, the image transfer unit 346-2 may set, to the image to be transferred, the non-polarization image before and after the traveling direction.

Further, the image transfer unit 346-2 sets a transfer area to the image to be transferred on the basis of the analysis object discrimination information and transfers an image of the transfer area along with the analysis object discrimination information to the integrated control unit 40 via the communication network 20. In addition, where the transfer of the image is performed in units of lines, the transfer area is set in units of lines.

In the seventh embodiment configured as described above, the processing is performed similarly to the flowchart illustrated in FIG. 21; further, in the transfer of the image, the non-polarization image of the transfer area discriminated on the basis of the analysis object discrimination information is transferred along with the analysis object discrimination information.

Figure 24:
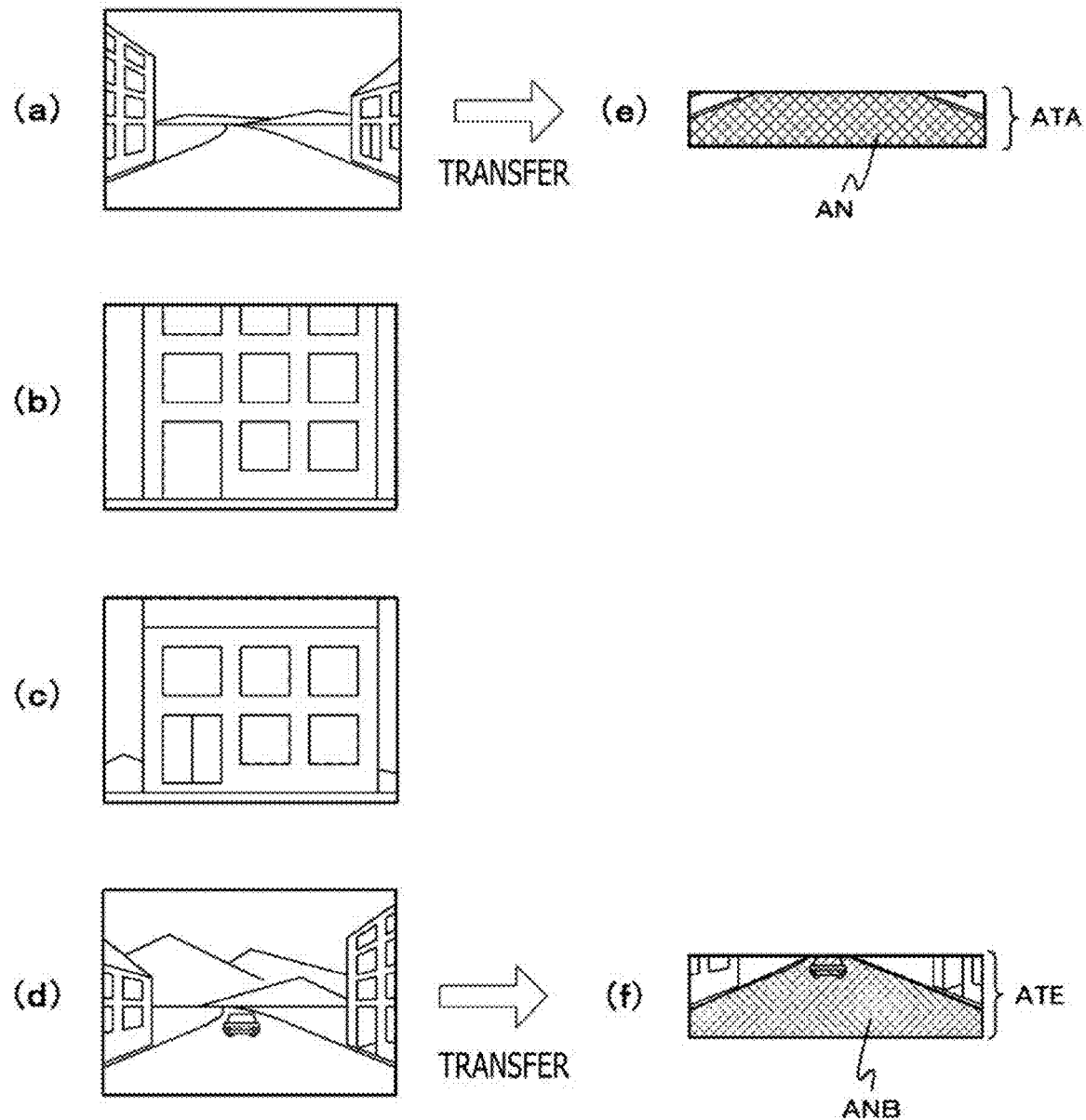
FIG. 24 is a diagram exemplifying an operation of a seventh embodiment.

FIG. 24 exemplifies an operation of the seventh embodiment. Also, (a) of FIG. 24 exemplifies the non-polarization image acquired by the image acquisition unit 341A. Also, (b), (c), and (d) of FIG. 24 individually exemplify the non-polarization images acquired by the image acquisition units 341C, 341D, and 341E. Here, it is assumed in the images acquired by the image acquisition units 341A and 341E that the road surfaces are detected and the braking distances are calculated. Also, it is assumed in the images acquired by the image acquisition units 341C and 341D that the road surface is not detected. In this case, the image transfer unit 346 sets, to the image to be transferred, the images in which positions of the road surface and the braking distance are indicated, specifically, the non-polarization images acquired by the image acquisition units 341A and 341E. Further, in a case where the transfer of the image is performed in units of lines, the transfer area is set in units of lines. For example, lines in the area up to the position of the braking distance are set to the transfer area, specifically, images of the transfer area up to the position of the braking distance in the non-polarization images acquired by the image acquisition units 341A and 341E are transferred along with the analysis object discrimination information to the integrated control unit 40 via the communication network 20. On the basis of the received image and analysis object discrimination information, the image acquisition unit of the integrated control unit 40 performs the image analysis by using images of the image analysis areas AN and ANB that are areas of the road surfaces in images of transfer areas ATA and ATE illustrated in (e) and (f) of FIG. 24.

According to the seventh embodiment as described above, in a case where the image analysis is performed by the other control units etc. connected via the outer-vehicle information detection unit and the communication network, the images of the transfer areas set on the basis of the analysis object discrimination information are transmitted via the communication network 20 from the non-polarization images generated by the plurality of image acquisition units. Therefore, the data amount to be transferred can be further reduced as compared with a case in which all the images of the non-polarization images generated by respective image acquisition units are transferred or a case in which the image of the whole image including the image analysis area is transferred.

10. Another Embodiment

Also, a configuration of the outer-vehicle information detection unit 34 is not limited to the foregoing embodiments. In the discrimination information generation unit, for example, a road surface detection and a road surface roughness detection are performed by using the polarization image. The image analysis unit or the image transfer unit may set the image analysis area on the basis of the detection result of the road surface and the detection result of the road surface roughness and perform the image analysis of the image analysis area or the transfer of the image of the image analysis area.

Figure 25:
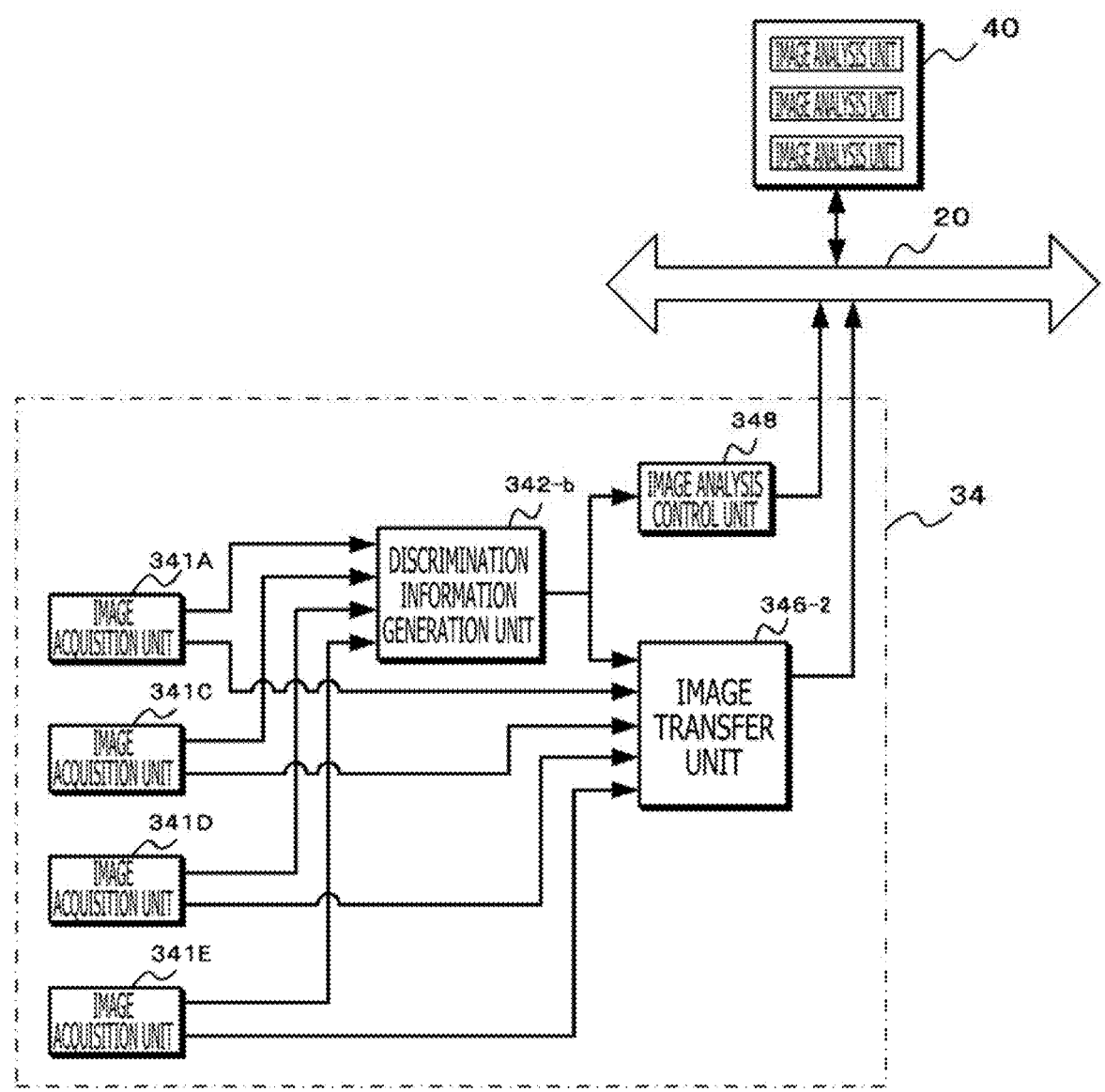
FIG. 25 is a diagram exemplifying a configuration of another embodiment.

Also, as illustrated in FIG. 25, an image analysis control unit 348 may be provided in the outer-vehicle information detection unit 34. The image analysis control unit 348 generates image analysis control information on the basis of the analysis object discrimination information and transfers the image analysis control information along with the image to the integrated control unit 40. For example, in a case where the image analysis is performed by using the plurality of image analysis units, the image analysis control information is information for controlling a sort etc. of the images to the plurality of image analysis units. On the basis of the analysis control information from the image analysis control unit, the integrated control unit 40 sorts images to the plurality of image analysis units and performs the image analysis while being shared by the plurality of analysis units similarly to the foregoing fourth embodiment.

In addition, in the foregoing embodiments, the analysis object discrimination information is generated from the polarization image indicating the peripheral area of the moving body; further, recognition processing etc. may be performed by using the non-polarization image indicating the peripheral area of the moving body and the analysis object discrimination information may be generated. Also, the detection result of the distance can be used as the analysis object discrimination information.

In the above embodiments, a case in which the moving body is a vehicle is described in detail. However, the moving body is not limited to a vehicle. For example, the foregoing image processing apparatus may be provided on a robot and movement control of the robot may be performed on the basis of the image analysis result. Also, the foregoing image processing apparatus may be provided on a marine vessel and discrimination between a land and a water surface may be performed on the basis of the polarization image; further, steering etc. of the marine vessel may be performed on the basis of the image analysis result of the water surface.

Also, a series of processing described in the specification can be performed by hardware, software, or both mixed constitutions. In a case where the processing is performed by software, programs in which a processing sequence is recorded are installed in a memory in a computer incorporated in dedicated hardware and are executed. Alternatively, programs can be installed in a general-purpose computer capable of performing various processing and can be executed.

For example, programs can be recorded in advance in a hard disk, an SSD (Solid State Drive), or a ROM (Read Only Memory) as a recording medium. Alternatively, programs can be temporarily or permanently stored (recorded) in a removable recording medium such as a flexible disc, a CD-ROM (Compact Disc Read Only Memory), an MO (Magneto optical) disc, a DVD (Digital Versatile Disc), a BD (Blu-Ray Disc (registered trademark)), a magnetic disc, or a semiconductor memory card. Such a removable recording medium can be provided as so-called package software.

Also, in addition to being installed in the computer from the removable recording medium, the program may be transferred by a radio channel or through a wired line to the computer from a download site through a network such as a LAN (Local Area Network) or the Internet. The computer can receive the program transferred as described above and install the program in a recording medium such as a built-in hard disk.

In addition, the effects described in the present specification are merely illustrative and not limited thereto, and there may be additional effects not described. Also, the present technology should not be construed to be limited to the foregoing embodiments of the technology. The embodiments of the technology disclose the present technology in the form of examples and it is obvious that those skilled in the art can make modifications and substitutions of the embodiments without departing from the gist of the present technology. That is, in order to determine the gist of the present technology, the scope of the claims should be considered.

Also, the image processing apparatus of the present technology may also take the following configurations.

(1)

An image processing apparatus including:

a discrimination information generation unit configured to generate analysis object discrimination information by using a polarization image indicating a peripheral area of a moving body; and an image analysis unit configured to perform discrimination of an object by using an image of an image analysis area set on the basis of the analysis object discrimination information generated by the discrimination information generation unit to a non-polarization image indicating the peripheral area of the moving body.

(2)

The image processing apparatus according to (1) above, in which the discrimination information generation unit generates the analysis object discrimination information indicating a road surface in the peripheral area of the moving body on the basis of the polarization image, and the image analysis unit sets the image analysis area in accordance with an area of the road surface.

(3)

The image processing apparatus according to (2) above, in which the discrimination information generation unit sets, to an area of the road surface, a continuous image area in which a direction of a normal line calculated from the polarization image is a vertical direction of the moving body.

(4)

The image processing apparatus according to any one of (1) to (3) above, in which the discrimination information generation unit generates, as the analysis object discrimination information, information related to a braking distance of the moving body in the peripheral area of the moving body by using the polarization image, and the image analysis unit sets an area within the braking distance as the image analysis area.

(5)

The image processing apparatus according to (4) above, in which, on the basis of a distance in the non-polarization image and the braking distance calculated from a roughness on a traveling surface and a moving speed, the discrimination information generation unit generates, as the analysis object discrimination information, information indicating an area within the braking distance in the non-polarization image.

(6)

The image processing apparatus according to any one of (1) to (5) above, in which the image analysis unit is provided in plurality, and the plurality of image analysis units share an area in which the non-polarization image is divided on the basis of the analysis object discrimination information and perform discrimination of the object.

(7)

The image processing apparatus according to (6) above, in which the analysis object discrimination information is information related to the braking distance of the moving body in the peripheral area of the moving body and information indicating the road surface in the peripheral area of the moving body, and the plurality of image analysis units perform discrimination of the object in an area within the braking distance by using many image analysis units as compared with other image areas.

(8)

The image processing apparatus according to (1) above, in which an image transfer unit that performs a transfer of the non-polarization image is provided, the image analysis unit is connected to the image transfer unit via a communication network, and the image transfer unit controls a transfer of the non-polarization image to the image analysis unit on the basis of the analysis object discrimination information generated by the discrimination information generation unit.

(9)

The image processing apparatus according to (8) above, in which the image transfer unit transfers an image of the image analysis area.

(10)

The image processing apparatus according to (8) above, in which the discrimination information generation unit generates the analysis object discrimination information by using the polarization image in each capturing direction, and the image transfer unit selects the non-polarization image transferred to the image analysis unit on the basis of the analysis object discrimination information generated by the discrimination information generation unit and transfers the selected non-polarization image along with the analysis object discrimination information.

(11)

The image processing apparatus according to (8) above, in which the discrimination information generation unit generates the analysis object discrimination information by using the polarization image in each capturing direction, and the image transfer unit selects the non-polarization image transferred to the image analysis unit on the basis of the analysis object discrimination information generated by the discrimination information generation unit and transfers an image of the image analysis area in the selected non-polarization image along with the analysis object discrimination information.

(12)

The image processing apparatus according to (8) above, in which an image analysis control unit and the plurality of image analysis units are provided, and the image analysis control unit generates image analysis control information to control that how discrimination of the object to the non-polarization image transferred to the image analysis unit from the image transfer unit is performed by the plurality of image analysis units on the basis of the analysis object discrimination information generated by the discrimination information generation unit and transmits the image analysis control information to the image analysis unit along with the non-polarization image.

INDUSTRIAL APPLICABILITY

According to the image processing apparatus, the image processing method, and the vehicle control system of the present technology, for example, the analysis object discrimination information is generated by the discrimination information generation unit by using the polarization image indicating the peripheral area of the vehicle. The image analysis unit performs the discrimination of an object such as the obstacle etc. on the road surface by using an image of the image analysis area set on the basis of the analysis object discrimination information generated by the discrimination information generation unit to the non-polarization image indicating the peripheral area of the vehicle. Therefore, the determination of the presence of the object can be efficiently performed from an image of the peripheral area of the moving body. Accordingly, for example, it is appropriate for a control system for performing safe driving by an automobile etc.

REFERENCE SIGNS LIST

10 . . . Vehicle control system
20 . . . Communication network
31 . . . Driving system control unit
32 . . . Body system control unit
33 . . . Battery control unit
34 . . . Outer-vehicle information detection unit
40 . . . Integrated control unit
51 . . . Input unit
52 . . . Voice output unit
53 . . . Display unit
80 . . . Vehicle
311 . . . Vehicle state detection unit
331 . . . Secondary cell
341 . . . Image acquisition unit
3411 . . . Polarization image acquisition unit
3412 . . . Non-polarization image acquisition unit
3413 . . . Distance detection image acquisition unit
342 . . . Discrimination information generation unit
3421 . . . Normal line detection unit
3422 . . . Road surface determination unit
3423 . . . Road surface roughness detection unit
3424 . . . Distance detection unit
3425 . . . Traveling speed detection unit
3426 . . . Braking distance information generation unit
344 . . . Image analysis unit
346 . . . Image transfer unit
348 . . . Image analysis control unit

The invention claimed is:

1. An image processing apparatus comprising:
a discrimination information generation unit configured to generate analysis object discrimination information by using a polarization image indicating a peripheral area of a moving body; and
an image analysis unit configured to perform discrimination of an object by using an image of an image analysis area set on the basis of the analysis object discrimination information generated by the discrimination information generation unit to a non-polarization image indicating the peripheral area of the moving body, wherein
the discrimination information generation unit generates, as the analysis object discrimination information, information related to a braking distance of the moving body in the peripheral area of the moving body by using the polarization image, and
the image analysis unit sets an area within the braking distance as the image analysis area.

2. The image processing apparatus according to claim 1, wherein
the discrimination information generation unit generates the analysis object discrimination information indicating a road surface in the peripheral area of the moving body on the basis of the polarization image, and
the image analysis unit sets the image analysis area in accordance with an area of the road surface.

3. The image processing apparatus according to claim 2, wherein
the discrimination information generation unit sets, to an area of the road surface, a continuous image area in which a direction of a normal line calculated from the polarization image is a vertical direction of the moving body.

4. The image processing apparatus according to claim 1, wherein,
on the basis of a distance in the non-polarization image and the braking distance calculated from a roughness on a traveling surface and a moving speed, the discrimination information generation unit generates, as the analysis object discrimination information, information indicating an area within the braking distance in the non-polarization image.

5. The image processing apparatus according to claim 1, wherein
the image analysis unit is provided in plurality, and
the plurality of image analysis units share an area in which the non-polarization image is divided on the basis of the analysis object discrimination information and perform discrimination of the object.

6. The image processing apparatus according to claim 5, wherein
the analysis object discrimination information is information related to the braking distance of the moving body in the peripheral area of the moving body and information indicating the road surface in the peripheral area of the moving body, and
the plurality of image analysis units perform discrimination of the object in an area within the braking distance by using many image analysis units as compared with other image areas.

7. The image processing apparatus according to claim 1, wherein
an image transfer unit that performs a transfer of the non-polarization image is provided,
the image analysis unit is connected to the image transfer unit via a communication network, and
the image transfer unit controls a transfer of the non-polarization image to the image analysis unit on the basis of the analysis object discrimination information generated by the discrimination information generation unit.

8. The image processing apparatus according to claim 7, wherein
the image transfer unit transfers an image of the image analysis area.

9. The image processing apparatus according to claim 7, wherein
the discrimination information generation unit generates the analysis object discrimination information by using the polarization image in each capturing direction, and
the image transfer unit selects the non-polarization image transferred to the image analysis unit on the basis of the analysis object discrimination information generated by the discrimination information generation unit and transfers the selected non-polarization image along with the analysis object discrimination information.

10. The image processing apparatus according to claim 7, wherein
the discrimination information generation unit generates the analysis object discrimination information by using the polarization image in each capturing direction, and
the image transfer unit selects the non-polarization image transferred to the image analysis unit on the basis of the analysis object discrimination information generated by the discrimination information generation unit and transfers an image of the image analysis area in the selected non-polarization image along with the analysis object discrimination information.

11. The image processing apparatus according to claim 7, wherein
an image analysis control unit and the plurality of image analysis units are provided, and
the image analysis control unit generates image analysis control information to control that how discrimination of the object to the non-polarization image transferred to the image analysis unit from the image transfer unit is performed by the plurality of image analysis units on the basis of the analysis object discrimination information generated by the discrimination information generation unit and transmits the image analysis control information to the image analysis unit along with the non-polarization image.

12. An image processing method comprising:
generating analysis object discrimination information by a discrimination information generation unit by using a polarization image indicating a peripheral area of a moving body; and
performing discrimination of an object by an image analysis unit by using an image of an image analysis area set on the basis of the analysis object discrimination information generated by the discrimination information generation unit to a non-polarization image indicating the peripheral area of the moving body, wherein generating analysis object discrimination information includes generating, as the analysis object discrimination information, information related to a braking distance of the moving body in the peripheral area of the moving body by using the polarization image, further including setting, by the image analysis unit, an area within the braking distance as the image analysis area.

13. A vehicle control system comprising:
a discrimination information generation unit configured to generate analysis object discrimination information by using a polarization image indicating a peripheral area of a vehicle;
an image analysis unit configured to perform discrimination of an object by using an image of an image analysis area set on the basis of the analysis object discrimination information generated by the discrimination information generation unit to a non-polarization image indicating the peripheral area of the vehicle; and
a driving system control unit configured to perform control of the vehicle on the basis of a discrimination result of the object in the image analysis unit, wherein
the discrimination information generation unit generates, as the analysis object discrimination information, information related to a braking distance of the vehicle in the peripheral area of the vehicle by using the polarization image, and
the image analysis unit sets an area within the braking distance as the image analysis area.

* * * * *